United States Patent
Wang et al.

(10) Patent No.: US 12,255,363 B2
(45) Date of Patent: Mar. 18, 2025

(54) INTEGRATED FUEL CELL AND COMBUSTOR ASSEMBLY

(71) Applicant: General Electric Company, Schenectady, NY (US)

(72) Inventors: Honggang Wang, Clifton Park, NY (US); Michael A. Benjamin, Cincinnati, OH (US); Seung-Hyuck Hong, Clifton Park, NY (US); Richard L. Hart, Broadalbin, NY (US)

(73) Assignee: General Electric Company, Evendale, OH (US)

( * ) Notice: Subject to any disclaimer, the term of this patent is extended or adjusted under 35 U.S.C. 154(b) by 240 days.

(21) Appl. No.: 17/396,401

(22) Filed: Aug. 6, 2021

(65) Prior Publication Data
US 2023/0039759 A1 Feb. 9, 2023

(51) Int. Cl.
*H01M 8/04111* (2016.01)
*H01M 8/04746* (2016.01)
*H01M 8/2457* (2016.01)

(52) U.S. Cl.
CPC .... *H01M 8/04111* (2013.01); *H01M 8/04753* (2013.01); *H01M 8/2457* (2016.02)

(58) Field of Classification Search
None
See application file for complete search history.

(56) References Cited

U.S. PATENT DOCUMENTS

| | | | |
|---|---|---|---|
| 5,401,589 A * | 3/1995 | Palmer | H01M 8/04 429/513 |
| 5,968,680 A | 10/1999 | Wolfe et al. | |
| 7,456,517 B2 | 11/2008 | Campbell et al. | |
| 7,709,118 B2 | 5/2010 | Lundberg | |
| 7,781,115 B2 | 8/2010 | Lundberg | |
| 7,966,830 B2 | 6/2011 | Daggett | |
| 10,641,179 B2 | 5/2020 | Hayama et al. | |
| 10,724,432 B2 | 7/2020 | Shapiro et al. | |
| 2002/0163819 A1 | 11/2002 | Treece | |
| 2003/0180583 A1* | 9/2003 | Ichikawa | B60L 15/2045 429/9 |
| 2011/0014414 A1* | 1/2011 | Senior | B32B 21/14 428/106 |

(Continued)

FOREIGN PATENT DOCUMENTS

| | | |
|---|---|---|
| CN | 106976405 A | 7/2017 |
| JP | 2018087501 A | 6/2018 |

*Primary Examiner* — Alix E Eggerding
(74) *Attorney, Agent, or Firm* — Dority & Manning, P.A.

(57) ABSTRACT

An integrated fuel cell and combustor assembly includes a combustor that is fluidly coupled with at least one upstream compressor that generates compressed air. A fuel cell stack having a cathode and an anode is fluidly coupled to the combustor. The fuel cell stack is configured to receive intake fuel and a portion of the compressed air as intake air, to generate a fuel cell power output using the intake fuel and the intake air, and to direct a fuel and air exhaust from the fuel cell stack into the combustor. A self-reliant air supply system is fluidly coupled with the at least one upstream compressor and the fuel cell stack, and is configured to supply the intake air to the fuel cell stack. A fault-tolerant controller is configured to detect a transient event within the combustor and to control the self-reliant air supply system during the transient event.

19 Claims, 8 Drawing Sheets

(56) References Cited

U.S. PATENT DOCUMENTS

| | | | |
|---|---|---|---|
| 2012/0021315 A1* | 1/2012 | Tamura | H01M 8/04686 |
| | | | 429/423 |
| 2014/0325991 A1 | 11/2014 | Liew et al. | |
| 2016/0099476 A1* | 4/2016 | Palumbo | H01M 8/2484 |
| | | | 429/434 |
| 2019/0136761 A1* | 5/2019 | Shapiro | H01M 8/04201 |
| 2019/0148748 A1* | 5/2019 | Bozzolo | H01M 8/04365 |
| | | | 429/439 |

* cited by examiner

INTEGRATED FUEL CELL AND COMBUSTOR ASSEMBLY

TECHNICAL FIELD

The present disclosure generally relates to power-generating systems, such as fuel cells and gas turbine engines. In particular, the present disclosure relates to a gas turbine engine having a combustion system and a fuel cell.

BACKGROUND

Fuel efficiency of engines can be an important consideration in the selection and operation of engines. For example, fuel efficiency of gas turbine engines in aircraft can be an important (and a limiting) factor on how far the aircraft can travel. Current aircraft jet engines generally provide mostly mechanical power that is converted into propulsion using a fan mounted shaft and a small amount of power generation. Some aircraft propulsion systems can, however, include fuel cells in addition to the gas turbine engines. These fuel cells can be located upstream of combustors of the gas turbine engines and downstream from compressors of the gas turbine engines. Compressed air that is output by the compressors flows along the length of the engine and into the fuel cells. A portion of this air is consumed by the fuel cells in generating electrical energy that can be used to operate electrical devices associated with the operation of the gas turbine engines. The rest of the air can flow through the fuel cells or around the fuel cells and into a combustor. This air is then mixed with fuel and combusted in the combustor of the engine to generate combustion products that exit the engine at high speed and generate thrust.

BRIEF DESCRIPTION OF THE DRAWINGS

The foregoing and other features and advantages will be apparent from the following, more particular, description of various embodiments, as illustrated in the accompanying drawings, wherein like reference numbers generally indicate identical, functionally similar, and/or structurally similar elements.

DETAILED DESCRIPTION

Figure 1:
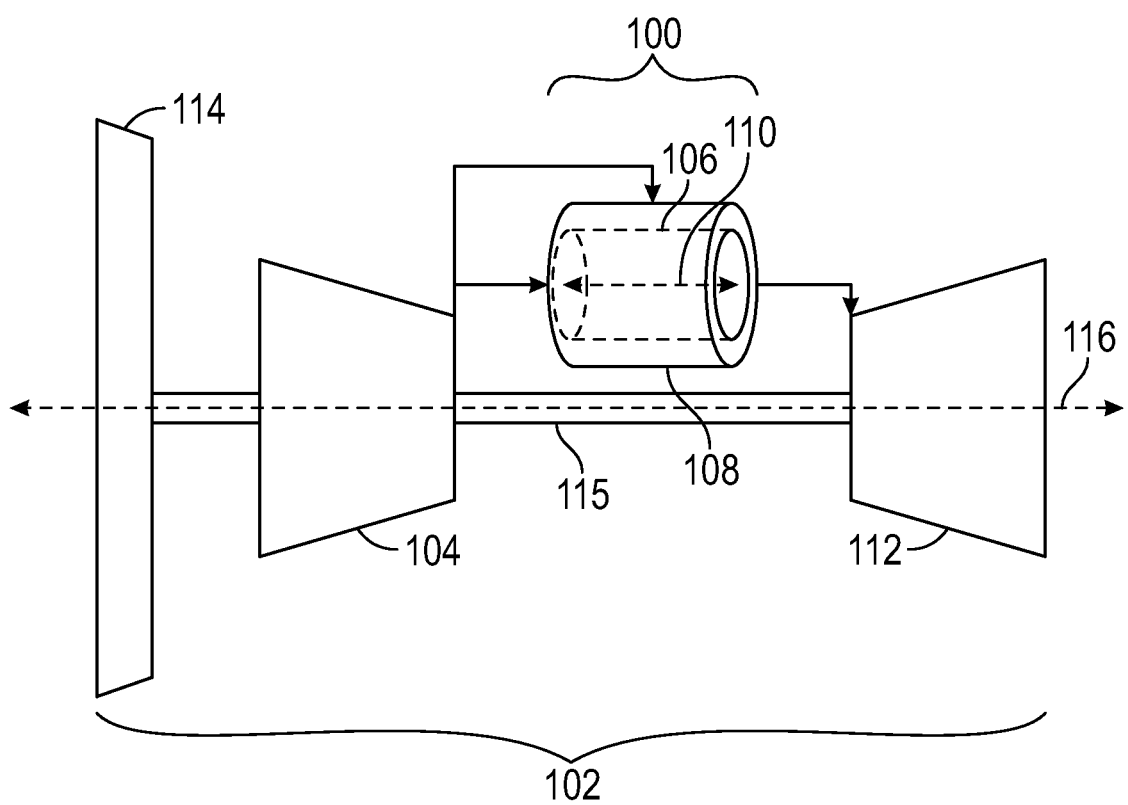
FIG. 1 shows a schematic illustration of an embodiment of an integrated fuel cell and combustor assembly used in a gas turbine engine system, according to an embodiment of the present disclosure.

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

Reference will now be made in detail to present embodiments of the disclosed subject matter, one or more examples of which are illustrated in the accompanying drawings. The detailed description uses numerical and letter designations to refer to features in the drawings. Like or similar designations in the drawings and description have been used to refer to like or similar parts of the disclosed subject matter. As used herein, the terms "first," "second," "third", "fourth," and "exemplary" may be used interchangeably to distinguish one component from another and are not intended to signify location or importance of the individual components.

Further, as used herein, the terms "fuel cell stack" and "plurality of fuel cells" and "multiple cells" and "multiple fuel cells" may be used interchangeably to distinguish one component from another and are not intended to signify location or importance of the individual components.

Further, as used herein, the terms "fuel reformer" and "catalytic partial oxidation convertor" may be used interchangeably to distinguish one component from another and are not intended to signify location or importance of the individual components.

Further, as used herein, the terms "LP Compressor" and "LP compressor" and "LPC" and "low pressure compressor" may be used interchangeably to distinguish one component from another and are not intended to signify location or importance of the individual components.

Further, as used herein, the terms "HP Compressor" and "HP Compressor" and "HPC" and "high pressure compressor" may be used interchangeably to distinguish one component from another and are not intended to signify location or importance of the individual components.

Further, as used herein, the terms "LP Turbine" and "LP turbine" and "LPT" and "low pressure turbine" may be used interchangeably to distinguish one component from another and are not intended to signify location or importance of the individual components.

Further, as used herein, the terms "HP Turbine" and "HP turbine" and "HPT" and "high pressure turbine" may be used interchangeably to distinguish one component from another and are not intended to signify location or importance of the individual components.

Further, as used herein, the terms "SOFC" and "Solid Oxide Fuel Cell" and "Fuel Cells" and "fuel cells" may be used interchangeably to distinguish one component from another and are not intended to signify location or importance of the individual components.

Further, as used herein, the term "check valve" or "one-way check valve" is a valve that normally allows fluid (liquid or gas) to flow through it in only one direction. A check valve works automatically and does not need any controller. The terms "control valve" or "valve" may be used interchangeably and is a valve used to control fluid flow by varying the size of the flow passage as directed by a signal from a controller. A control valve may comprise of a throttling valve wherein the valve position can go anywhere from "fully closed" to "fully open", or a solenoid valve which is either "fully open" or "fully closed".

Gas turbine engines, such as those used to power aircrafts or in industrial applications, typically include a compressor, a combustor, and a turbine, disposed about a central engine axis, with the compressor disposed axially upstream of the combustor and the turbine disposed axially downstream of the combustor. In a steady state operating condition, the compressor pressurizes a supply of air, the combustor burns a hydrocarbon fuel in the presence of the pressurized air, and the turbine extracts energy from the resultant combustion gases and this cycle continues on until the cycle is brought to a deliberate stop.

In the case of transient events, such as when a flameout occurs in a gas turbine engine, the combustion reaction within the combustor is unintentionally or unexpectedly extinguished bringing the operation of the gas turbine engine, momentarily, to a stop. A flameout in a gas turbine engine can be caused by various reasons, including pressure variations, a stall in the compressor, insufficient oxygen in the ambient air (e.g., at high altitude), severe weather conditions, foreign object damage (FOD), and such other events. A combustor transient event is an important event and it is attended to with urgency so that the combustor can relight and the combustion reaction can resume, reviving the operation of the gas turbine engine.

In the context of hybrid aircraft systems, fuel cells are integrated with gas turbine engines to enhance system efficiency and to reduce emission. A fuel cell produces electricity by electrochemically combining a fuel and an oxidant across an ionic conducting layer. This ionic conducting layer, also referred to as the electrolyte of the fuel cell, can be a liquid or solid. In practice, fuel cells are amassed in electrical series in an assembly of fuel cells to produce power at useful voltages or currents.

Components of a fuel cell include the electrolyte and two electrodes. The reactions that produce electricity generally take place at the electrodes where a catalyst is disposed to speed the reactions. The electrodes can be constructed as channels, porous layers, and the like, to increase the surface area for the chemical reactions to occur. The electrolyte carries electrically charged particles from one electrode to the other and is otherwise substantially impermeable to both fuel and oxidant. Common types of fuel cells include Solid Oxide Fuel Cells (SOFC), Molten Carbonate Fuel Cells (MCFC), Phosphoric Acid Fuel Cells (PAFC), and, Proton Exchange Membrane Fuel Cells (PEMFC), all generally named after their respective electrolytes.

An integrated fuel cell and combustor system architecture can be provided to maintain a continuous operation of the SOFC subsystem during transient events and to protect the SOFC material from damage (so that the fuel cells stay in a healthy envelop for chemical and mechanical integrity). SOFC operation needs controlled flow of intake air and intake fuel and engine system configurations generally rely on exit air from high pressure compressors (HPC) for the intake air. A flameout or a transient event like that, however, leads to a sudden loss of intake air, causing the SOFC subsystem to fail. A robust and reliable system architecture is needed to protect an SOFC subsystem during transient events mentioned above.

As part of an integrated fuel cell and combustor system architecture, a fault-tolerant controller can monitor and control a self-reliant air supply system that sources one of the air supplies still available during the transient time and utilizes the available air supply to sustain the SOFC subsystem during the transient event. Further, the redundant power, thus available from the sustained fuel cells, may be leveraged to power a re-ignition of the combustor and revival and transition of the gas turbine engine out of the transient event.

FIG. 1 shows a schematic illustration of an embodiment of an integrated fuel cell and combustor assembly 100 used in a gas turbine engine 102, according to an embodiment of the present disclosure. The gas turbine engine 102 includes one or more compressors 104 that receive inlet air and compress this air via one or more stages of rotating blades. The compressed air is directed into the fuel cell and combustor assembly 100.

The combustor assembly 100 includes a combustor 106 that is circumferentially surrounded along some of the length of the combustor or all of the length of the combustor 106 by a fuel cell stack 108. The fuel cell stack 108 includes multiple fuel cells arranged to convert fuel and compressed air from the compressor 104 into electrical energy. The fuel cell stack 108 can be integrated into an outer portion of the combustor 106 such that the fuel cell stack 108 is part of the combustor 106 and is located radially outside of the combustor 106 (e.g., relative to an axis 110 of the combustor 106). The gas turbine engine 102 includes a center axis 116 that may be coincident with the axis 110 or may not be coincident with the axis 110.

Some of the compressed air exiting the compressor 104 is directed through the fuel cells in the fuel cell stack 108 in radially inward directions toward the axis 110 of the combustor 106. Some of the remaining amount of compressed air or all of the remaining amount of compressed air from the compressor 104 is directed into the combustor 106 in a direction along the axis 110 of the combustor 106 or parallel to the axis 110 of the combustor 106.

The fuel cells in the fuel cell stack 108 receive fuel from designated fuel manifolds (e.g., 200 in FIG. 2) and air from the compressor 104 and convert the fuel and air into electrical energy. Combustor 106 is configured to combust partially oxidized fuel and air exhaust from the fuel, additional air from the compressor 104, and/or additional fuel from one or more fuel injectors. Exhaust from the combusted fuel and air mixture is then directed into a turbine 112, that converts the exhaust into rotating energy that can be used to power one or more loads 114, such as a fan used to propel a vehicle (e.g., an aircraft), a generator, or the like, via a shaft 115.

Figure 2:
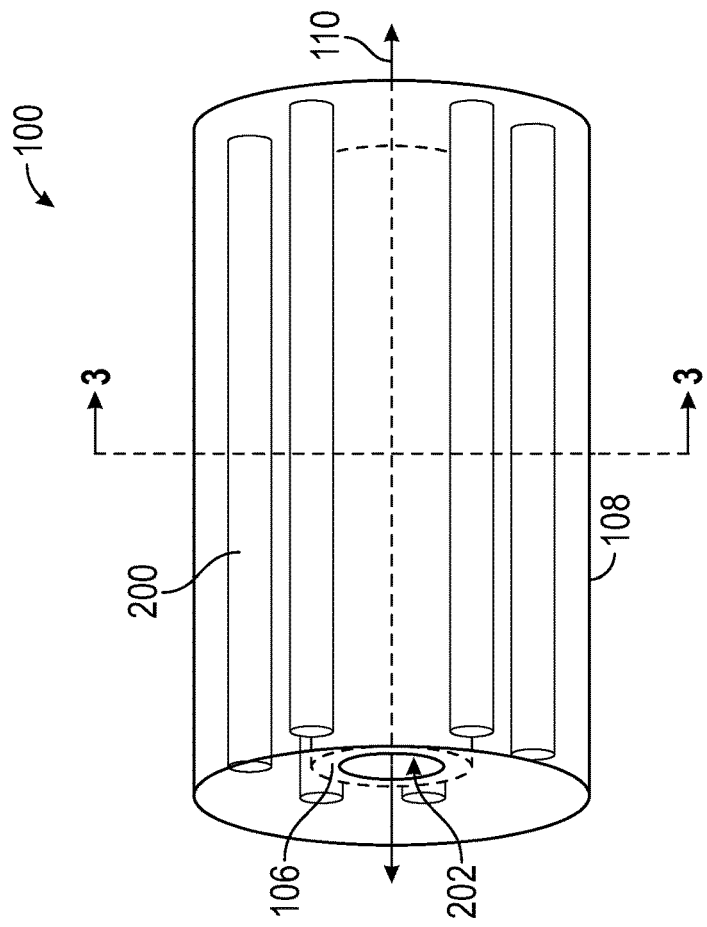
FIG. 2 shows a schematic illustration of an integrated fuel cell and combustor assembly used in a gas turbine engine system, according to an embodiment of the present disclosure.

FIG. 2 shows a schematic illustration of an integrated fuel cell and combustor assembly used in a gas turbine engine system, according to an embodiment of the present disclosure. The fuel cell stack 108 includes several fuel manifolds 200 located at different locations along the perimeter of the combustor 106. The fuel cell stack 108 directly abuts the combustor 106 along the length of the combustor 106. The fuel cell stack 108 can form the outer liner of the combustor 106 or boundary of the combustor 106. Further, the fuel cell stack 108 can be integrally formed with the combustor 106. An integral arrangement reduces or eliminates the need for additional ducting to fluidly couple the fuel cell stack 108 with the combustor 106.

The combustor 106 includes a combustion chamber 202 that is fluidly coupled with the compressor 104, the turbine 112, and the fuel cell stack 108. The combustion chamber 202 receives unspent fuel and air from the fuel cell stack 108 and supplemental fuel and air from the compressor 104. This supplemental fuel and air do not pass through any fuel cells in the fuel cell stack 108 or flow through any fuel cells in the fuel cell stack 108, and can flow into the combustion chamber 202 in directions along the axis 110 or parallel to the axis 110.

Figure 3:
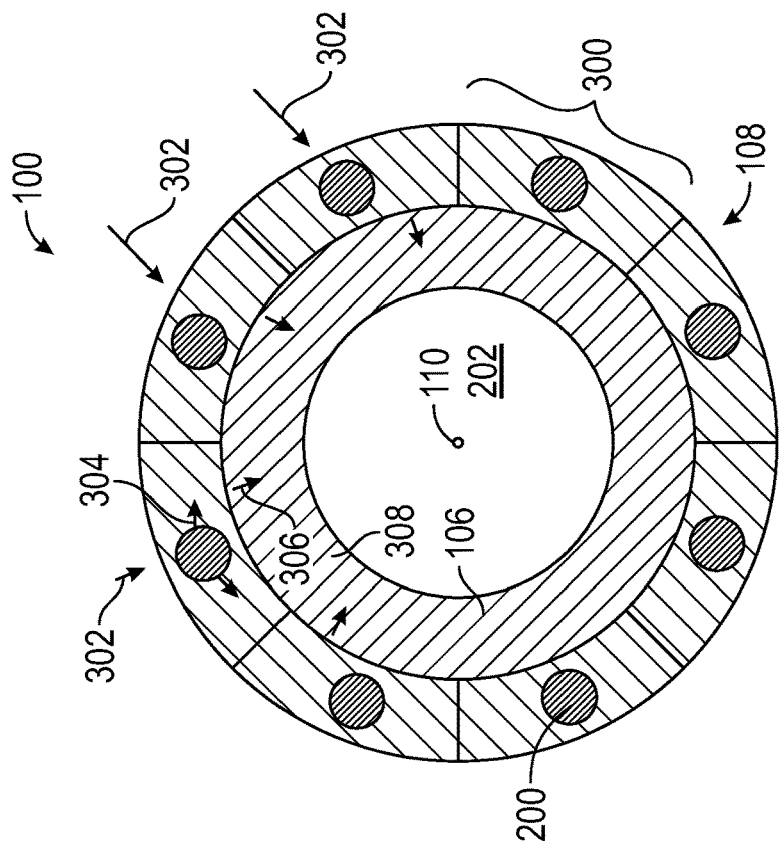
FIG. 3 shows a schematic cross-sectional view of a fuel cell of the integrated fuel cell and combustor assembly taken along the line 3-3 of FIG. 2, according to an embodiment of the present disclosure.

FIG. 3 shows a cross-sectional view of a plurality of fuel cells 300 of the integrated fuel cell and combustor assembly 100 taken along line 3-3 of FIG. 2, according to an embodiment of the present disclosure. As shown, the fuel cell stack 108 circumferentially extends around the combustion chamber 202 of the combustor 106 by completely encircling the combustion chamber 202 around the axis 110. The fuel cells 300 are formed as parts of the fuel cell stack 108. The fuel cells 300 that are visible in FIG. 3 may be a single ring of fuel cells 300, with the fuel cells 300 axially stacked together to form the fuel cell stack 108. In another instance, multiple additional rings of fuel cells 300 may be placed on top of each other to form the fuel cell stack 108 that is elongated along the axis 110.

The fuel cells 300 in the fuel cell stack 108 are positioned to receive discharged air 302 from the compressor 104 and fuel 304 from the fuel manifolds 200. The fuel cells 300 generate electrical current using this air 302 and at least some of this fuel 304, and radially direct the partially oxidized fuel 306 and unused part of air 308 into the combustion chamber 202 of the combustor 106 toward the axis 110. The combustor 106 combusts the partially oxidized fuel 306 and air 308 in the combustion chamber 202 into one or more gaseous combustion products (e.g., exhaust), that are directed into the downstream turbine 112 and drive the downstream turbine 112.

Figure 4:
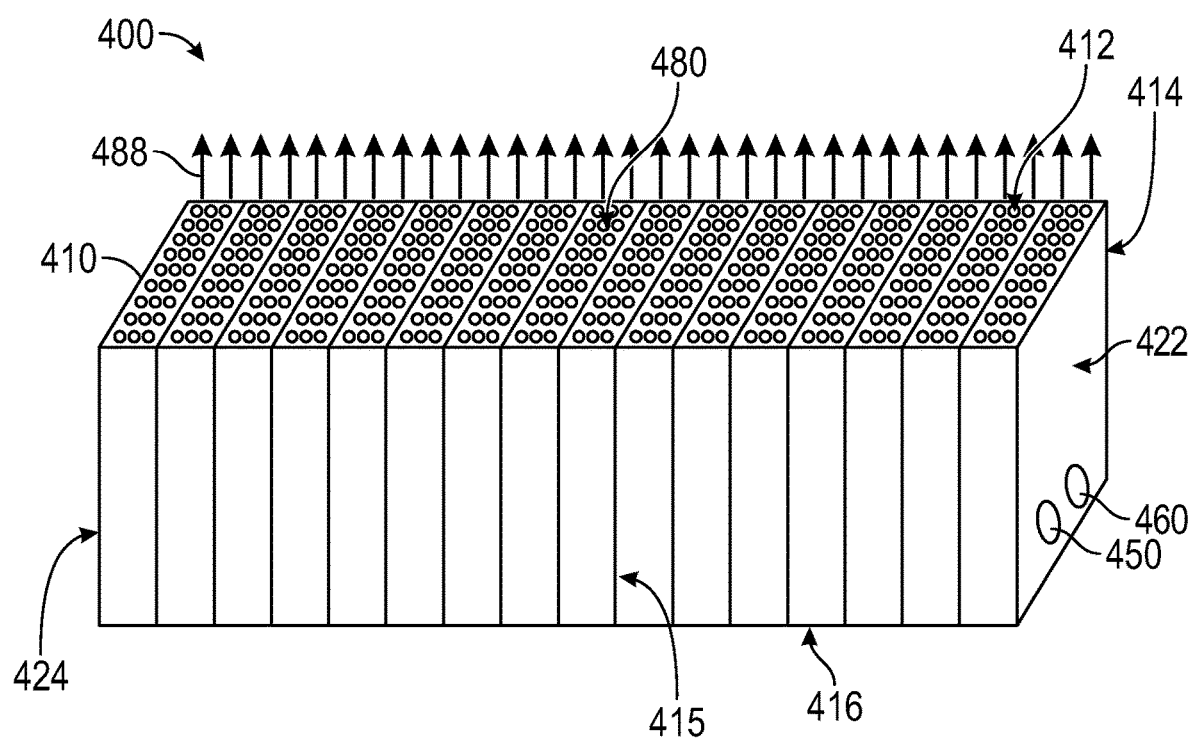
FIG. 4 shows a schematic illustration of fuel cells of an integrated fuel cell and combustor assembly used in a gas turbine engine system, according to an embodiment of the present disclosure.

FIG. 4 shows a schematic illustration of fuel cells used in an integrated fuel cell and combustor system 400 used in a gas turbine engine system (e.g., gas turbine engine 102 of FIG. 1), which is further described in, e.g., US 2020/0194799 A1, which is incorporated by reference herein in entirety. The combustor system 400 includes a housing 410 having a combustion outlet side 412 and a side 416 that is opposite to the combustion outlet side 412, a fuel and air inlet side 422 and a side 424 that is opposite to the fuel and air inlet side 422, and sides 414, 415. The side 414 and the side 416 are not visible in the perspective view of FIG. 4.

The combustion outlet side 412 includes several combustion outlets 480 from which a combustion gas 488 is directed out of the housing 410. As described herein, the combustion gas 488 can be created using fuel and air that is not consumed by fuel cells in a fuel cell stack inside the housing 410. This combustion gas 488 can be used to generate propulsion for a vehicle or thrust for a vehicle, such as a manned aircraft or an unmanned aircraft.

The fuel and air inlet side 422 includes one or more inlets 450 and one or more inlets 460. Optionally, one or more of the inlets 450, 460 can be on another side of the housing 410. The inlet 450 is fluidly coupled with a source of fuel for the fuel cells, such as one or more pressurized containers of a hydrogen-containing gas and/or a catalytic partial oxidation convertor as described further below. The inlet 460 is fluidly coupled with a source of air for the fuel cells, such as air that is discharged from a compressor provided with a gas turbine engine and/or a preburner system as described further below. The inlets 450, 460 separately receive the fuel and air from the external sources of fuel and air, and separately direct the fuel and air into the fuel cells.

In one embodiment, the system 400 can be formed from one hundred fuel cells stacked side-by-side from the end 422 to the end 424. Alternatively, the system 400 can include fewer or more fuel cells stacked side-by-side. According to one embodiment, the system 400 can be eight centimeters tall, 2.5 centimeters wide, and twenty-four centimeters long. Alternatively, the system 400 can be taller or shorter, wider or narrower, and/or longer or shorter than these example dimensions.

Figure 5:
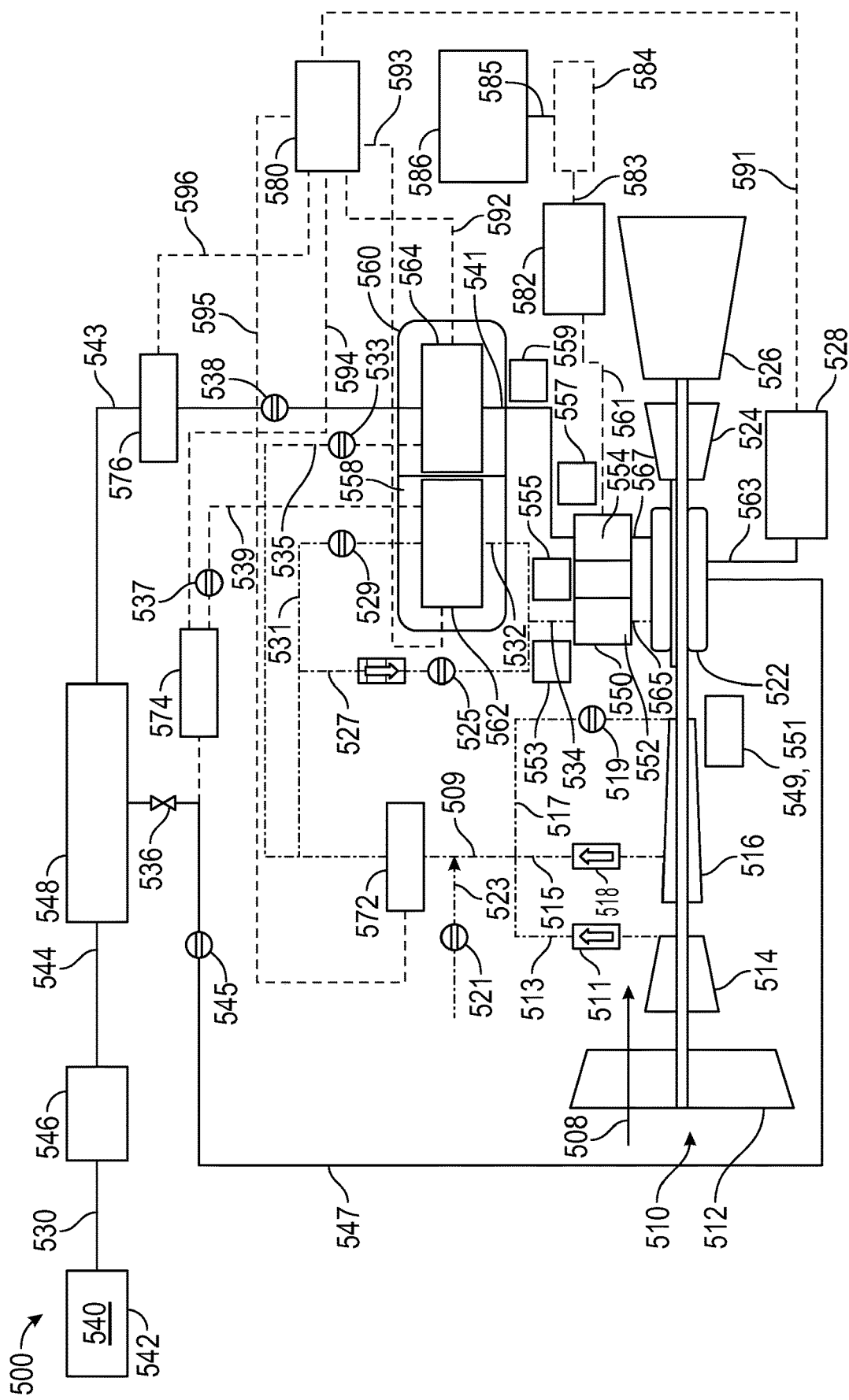
FIG. 5 shows a schematic illustration of an integrated fuel cell and combustor assembly used in a gas turbine engine system under steady state conditions, according to an embodiment of the present disclosure.

FIG. 5 shows a schematic illustration of an integrated fuel cell and combustor assembly 500 used in a gas turbine engine system under steady state conditions, according to an embodiment of the present disclosure. As shown in FIG. 5, the gas turbine engine assembly 500 includes a gas turbine engine 510. The gas turbine engine 510 includes a fan 512, a compressor 514 (low pressure compressor or LPC) and/or 516 (high pressure compressor or HPC), a fuel cell stack 550 that is disposed downstream of the compressor 514 and/or 516 and upstream and/or integrated within a liner region of a combustor 522, and a turbine 524 (low pressure turbine or LPT) and/or 526 (high pressure turbine or HPT) that is disposed downstream of the combustor 522.

Ambient air 508 is blown in by the fan 512, pressurized by compressor 514 (low pressure compressor or LPC), compressor 516 (high pressure compressor or HPC), and mixed with fuel before entering the combustor 522. The gas turbine engine assembly 500 further includes an LP bleed air stream 513 and an associated LP bleed air check valve 511, an HP bleed air stream 515 and an associated HP bleed air check valve 518, an HP exit air stream 517 and an associated HP exit air control valve 519, an air stream 523 and an associated ambient air control valve 521. There may be an LP bleed air control valve (not shown) associated with LP bleed air stream 513, as well as a HP bleed air control valve (not shown) asssociated with HP bleed air stream 515. The air stream 523 may come from a cross-bleed air from a second gas turbine engine, a bleed air from an auxiliary power unit (APU), air from a ram air turbine (RAT) and cabin air. The air stream 523 may be complimentary if the compressor air source (air streams 513, 515 and 517) is inadequate or unavailable.

As shown in FIG. 5, the gas turbine engine assembly 500 further includes the fuel cell stack 550 having multiple fuel cells integrated with the combustor 522. The fuel cell stack 550 is integrated into the outer liners and/or inner liners of the combustor 522. The fuel cell stack 550 includes a cathode 552, an anode 554, a cathode temperature sensor 553, a cathode pressure sensor 555, an anode pressure sensor 557, and an anode temperature sensor 559. The gas turbine engine assembly 500 further includes a cathode bypass air stream 527, an associated cathode bypass air valve 525 and a cathode air control valve 529. The fuel cell stack 550 outputs the power produced as fuel cell power output 561. Further, the fuel cell stack 550 directs a cathode air discharge 565 and an anode fuel discharge 567 radially into the combustor 522.

The gas turbine engine assembly 500 includes an engine operating condition monitoring element 528, connected with the combustor 522. The engine operating condition monitoring element 528 senses and/or detects transient events and several combustion related events, parameters, such as, presence (or absence) of a flame in the combustor 522, combustion exhaust temperature, engine shaft speed, cathode temperature as sensed by the cathode temperature sensor 553, cathode pressure as sensed by the cathode pressure sensor 555, anode pressure as sensed by the anode pressure sensor 557, and anode temperature as sensed by the anode temperature sensor 559 by an engine operating condition sensor line 563. The engine operating condition monitoring element 528 sends an engine operating parameter detection signal 591 to a controller 580 based on the sensing and/or detecting of the transient events and several combustion related events, parameters mentioned above.

As shown in FIG. 5, the gas turbine engine assembly 500 also includes a fuel processing unit 560 that includes a fuel reformer or a catalytic partial oxidation convertor (CPOx) 564 for developing a hydrogen rich fuel stream for fuel cell stack 550. The fuel processing unit 560 further includes an anode fuel control valve 538 associated with a CPOx fuel stream 543, a CPOx air stream 535 and a CPOx air control valve 533 associated with the CPOx air stream 535. It is to be noted that the fuel reformer 564 can be any other type of fuel reformer including autothermal reformer and steam reformer that may need an additional stream of steam inlet with higher hydrogen composition at the reformer outlet stream.

The gas turbine engine assembly 500 further includes an air processing unit 558 that includes a preburner system 562 for raising the temperature of air that is discharged from the compressors 514 and/or 516 to a temperature high enough to enable fuel cell temperature control (e.g., —600° C. to 800° C.). Air processing unit 558 processes (or conditions) a preburner air stream 531 passing through the cathode air control valve 529.

According to an embodiment, the preburner system 562 and the CPOx 564 can be manifolded together to provide conditioned air and fuel to the fuel cell stack 550. The CPOx 564, the preburner system 562, and the fuel cell stack 550 having multiple fuel cells are closely coupled within the gas turbine engine assembly 500, such that the CPOx 564, the preburner system 562, and the fuel cell stack 550 are positioned as close as possible to each other within the gas turbine engine assembly 500. The preburner system 562 of FIG. 5 could alternatively be a heat exchanger or another device for raising the temperature of the air that is discharged from the compressor 514 and/or 516 to a temperature high enough to enable fuel cell temperature control (e.g., —600° C. to 800° C.).

In operation, the air processing unit 558 is configured to heat/cool a portion of the compressed air 509, incoming as preburner air stream 531 and to a generate processed air 532 to be directed into the fuel cell stack 550 to facilitate the functioning of the fuel cell stack 550. The processed air 532 and a preburner fuel stream 539 are directed into the fuel cell stack 550 and at least partially converted into electrical energy. In an instance of the disclosure, the cathode bypass air stream 527 and the processed air 532 may combine into a combined air stream 534 to be fed into the cathode 552 of the fuel cell stack 550. Further, the cathode air discharge 565, the anode fuel discharge 567, the unused air, the unburned fuel, and/or other gaseous constituents of the fuel cell stack 550 are combusted (at least partially) in the combustor 522. The combustion in the combustor 522 generates gaseous combustion products that can be directed into the turbine 524 and/or 526, to thereby, drive the turbine 524 and/or 526.

The gas turbine engine assembly 500 further includes a supply of fuel 540 (e.g., a hydrocarbon fuel, including, e.g., a carbon-neutral fuel or synthetic hydrocarbons) stored in a fuel tank 542 and transported in stages through a pipeline 530, a fuel pump 546, and pumped as a fuel stream 544 to a flow divider 548. The flow divider 548, connected to a flow separator 536, divides fuel stream 544 into preburner fuel stream 539 flowing through a start fuel control valve 537 and a combustor fuel stream 547 flowing through an engine fuel control valve 545 to the combustor 522.

Further, as shown in the embodiment of FIG. 5, a first portion of fuel 540, as preburner fuel stream 539, is directed to the preburner system 562, while a second portion of fuel 540, CPOx fuel stream 543, is directed to the CPOx 564 for developing a hydrogen rich fuel stream (e.g., optimizing a hydrogen content of a fuel stream). As the temperature of the air that is discharged from the compressor 514 and/or 516 is raised to the desired temperature (e.g., 600° C. to 800° C.) within the preburner system 562, the heated air is then directed into the fuel cell stack 550 to facilitate the functioning of the fuel cell stack 550. In parallel, CPOx fuel stream 543, directed from the fuel tank 542 into the CPOx 564, is developed into an anode fuel stream 541, rich with hydrogen, to be fed into the fuel cell stack 550. Combustor fuel stream 547 is transported from the fuel tank 542 into the combustor 522 for the operation of a pilot/main burner (not shown) of the combustor 522.

The compressor 514 and/or 516 of the gas turbine engine assembly 500 receives the ambient air 508 and compresses this air via, e.g., one or more stages of rotating blades (not shown). A portion of the compressed air 509 and the CPOx air stream 535, is then directed into the fuel processing unit 560 for developing the anode fuel stream 541 rich with hydrogen for the fuel cell stack 550 that is located upstream of and/or integrated with the combustor 522. Another portion of the compressed air 509, i.e., preburner air stream 531, is directed into the air processing unit 558.

According to an embodiment of the present disclosure, by incorporating or integrating the fuel cell stack 550 along the combustor liner of the combustor (522), both air and fuel can be directed to the fuel cell stack 550 in a single pass, meaning there is no recycling of the unburned fuel or air from the fuel cell exhaust to the inlet of the fuel cell stack 550. Thus, there is no need for a separate recirculation blower or any related control means in this configuration.

Because the inlet air for the fuel cell stack 550 comes solely from the upstream compressor (514 and/or 516) without any other separately controlled air source, however, the inlet air for the fuel cell stack 550 that is discharged from the compressor (514 and/or 516) is subject to the air temperature changes that occur at different flight stages. For example, the air within the aircraft engine compressor may work at 200° C. during idle, 600° C. during take-off, 450° C. during cruise, etc. This type of temperature change to the inlet air directed to the fuel cell may lead to significant thermal transient issues (or even thermal shock) to the ceramic materials of the fuel cell, which could range from cracking to failure.

Thus, by fluidly connecting the preburner system 562 to (i) the compressor 514 and/or 516 (at an upstream side to the preburner system 562) and (ii) the fuel cell stack 550 (at a downstream side to the preburner system 562), the preburner system 562 serves as a control device or system to maintain the processed air 532 being directed into the fuel cell stack 550 at a temperature at a desired range (e.g., 700° C.±100° C., or preferably 750° C.±50° C., or preferably 750° C.±20° C.).

The preburner system 562 is used to control the temperature of the fuel cell stack 550 to be at an intended operating temperature. For fuel cell stacks employing Yttria-stabilized zirconia (YSZ) electrolytes or Scandia-stabilized Zirconia (ScZ) electrolytes, the intended operating temperature is typically 700° C. to 800° C. For fuel cell stacks employing lower temperature electrolytes, such as, ceria based systems, the intended operating temperature is 550° C. to 650° C. In either case, the preburner system 562 provides a gas to the fuel cell stack 550 at an existing temperature that is up to ~200° C. less than the temperature intended during operation. During start up, the preburner system 562 provides a gas to the fuel cell stack 550 at a temperature that is potentially higher than the exiting temperature of the fuel cell stack 550. The intended operating temperature during start up is about (+0° C. through 400° C.) higher than the exiting temperature and the gas from the preburner system 562 gently brings up the temperature of the fuel cell stack 550 to the intended operating temperature.

Furthermore, by integrating the preburner system 562 with the CPOx 564 as well as the cathode bypass air stream 527, a better thermal management with enhanced operability and faster startup can be achieved. In an embodiment, individual components such as the air processing unit 558 or the fuel processing unit 560 or a fuel pressure controller 572 and their operations may be separately controlled to better manage the temperature of the processed air 532 being directed into the fuel cell stack 550. For example, the controller 580 can control valves which, in turn, control the flow of fuel to the preburner system 562 and/or the CPOx 564. The controller 580 also monitors other parts in the system and controls other parts in the system such as the fuel pressure controller 572, a cathode fuel flow controller 574, an anode fuel flow controller 576, an HPC exit pressure sensor 549, and an HPC exit temperature sensor 551.

In operation, the temperature of the air that is discharged from the compressor 514 and/or 516 can be controlled by controlling the flow of fuel to the preburner system 562 via the controller 580. For example, the controller 580 can close respective valves to decrease the amount of fuel flowing into the preburner system 562, to thereby, decrease the temperature of the air that is discharged from the compressor 514 and/or 516 and directed into the preburner system 562. Further, the controller 580 can open respective valves to increase the amount of fuel flowing into the preburner system 562, to thereby, increase the temperature of the air that is discharged from the compressor 514 and/or 516 and directed into the preburner system 562. Optionally, no fuel can be delivered to the preburner system 562 from the fuel tank 542 to prevent the preburner system 562 from increasing and/or decreasing the temperature of the air that is discharged from the compressor 514 and/or 516 and directed into the preburner system 562.

The fuel cell stack 550 that is integrated into the outer and/or inner liners of the combustor 522 converts the anode fuel stream 541 and processed air 532 sent into the fuel cell stack 550 to generate power in the form of DC current. This electrical energy or fuel cell power output 561 is directed to a power convertor 582 in order to change the DC current into DC current or AC current that can be effectively utilized by one or more subsystems, such as, e.g., a motor/generator, fan, or other electrical devices. Continuing to refer to FIG. 5, the gas turbine engine assembly 500 further includes a starter 584 connected to the power convertor 582 by a connection 583, and an alternative, preexisting power source 586 connected to the starter 584 by a connection 585.

As is further shown in FIG. 5, the controller 580 is configured to sense and/or to detect and/or to control and/or to optimize the functioning of the various components of the gas turbine engine assembly 500. The sensing or control signals related to the controller 580 include the engine operating parameter signal 591 coming from the engine operating condition monitoring element 528, a control signal 592 controlling the cathode fuel flow controller 574, a control signal 593 controlling the air processing unit 558, a control signal 594 controlling fuel pressure controller 572, a control signal 595 controlling the fuel processing unit 560 and a control signal 596 controlling the anode fuel flow controller 576.

In operation, if the engine operating parameter signal 591 indicates that the cathode air temperature as sensed by the cathode air temperature sensor 553 is too high for the fuel cell stack 550, the controller 580 sends the control signal 593 to the air processing unit 558 to remove more heat from the processed air 532 of the compressor exit air prior to directing the processed air 532 into the fuel cell stack 550. Conversely, if the engine operating parameter signal 591 indicates that the cathode air temperature as sensed by the cathode air temperature sensor 553, is too low for the fuel cell stack 550, the controller 580 sends the control signal 593 to the air processing unit 558 to add more heat to the compressor exit air prior to directing the processed air flow into the fuel cell stack 550. In a similar manner, depending upon the engine operating parameter signal 591, the controller 580 controls the functioning of the fuel processing unit 560 via the control signal 595 in order to adjust, e.g., the flow rate of the fuel being directed from the fuel processing unit 560 and into the fuel cell stack 550.

Figure 6:
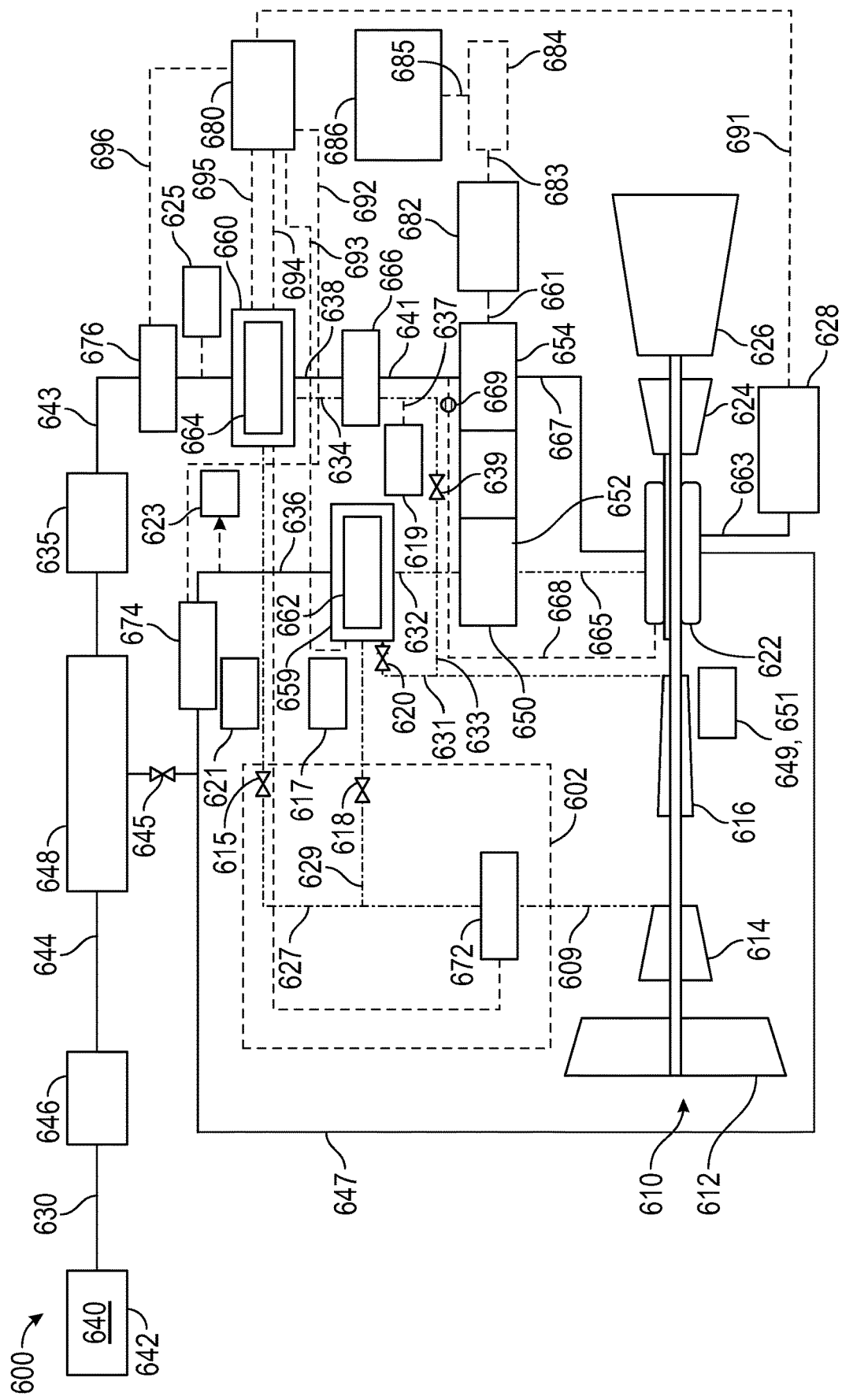
FIG. 6 shows a schematic illustration of an integrated fuel cell and combustor assembly used in a gas turbine engine system under transient conditions, according to an embodiment of the present disclosure.
Figure 7:
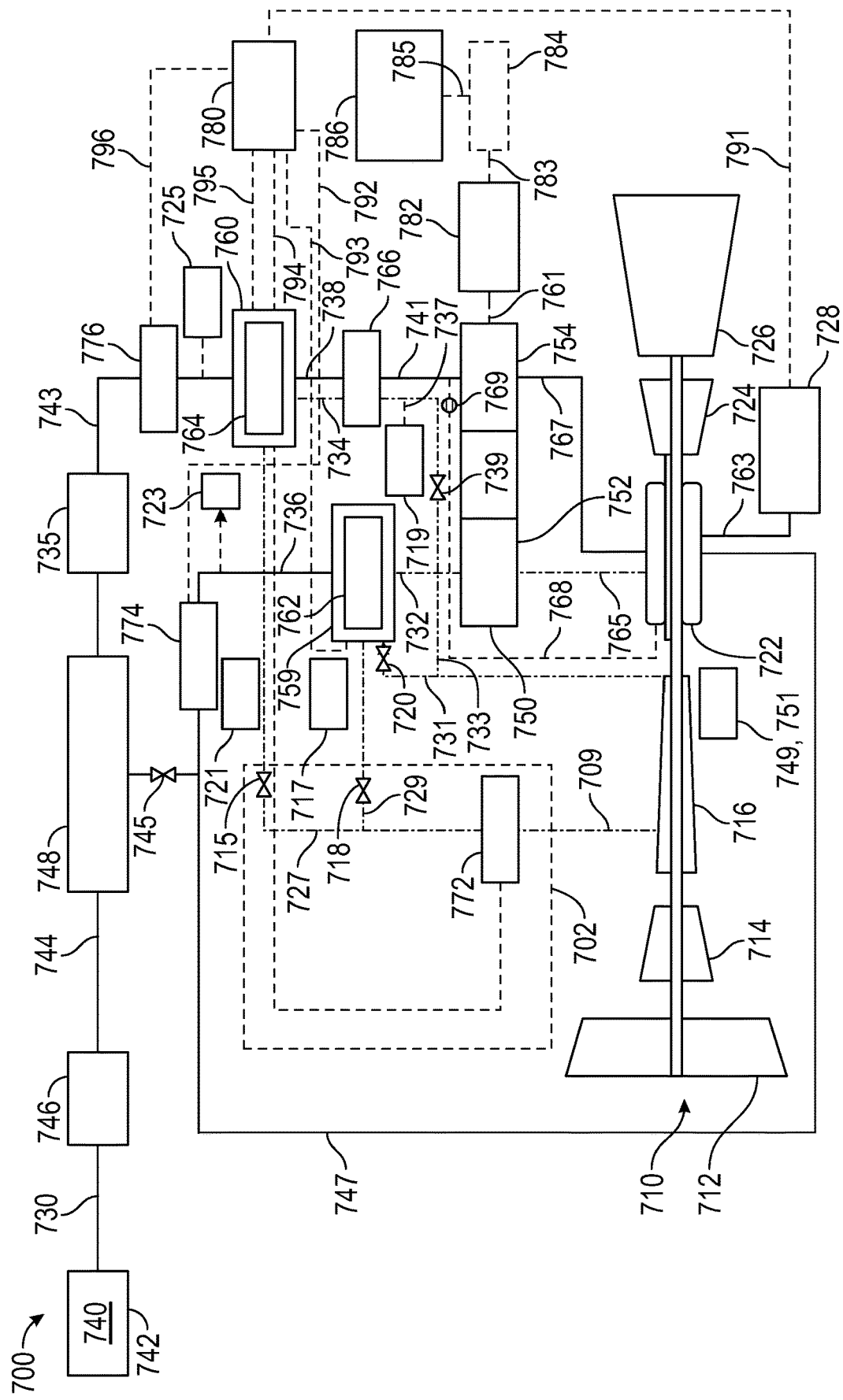
FIG. 7 shows a schematic illustration of an integrated fuel cell and combustor assembly used in a gas turbine engine system under transient conditions, according to another embodiment of the present disclosure.
Figure 8:
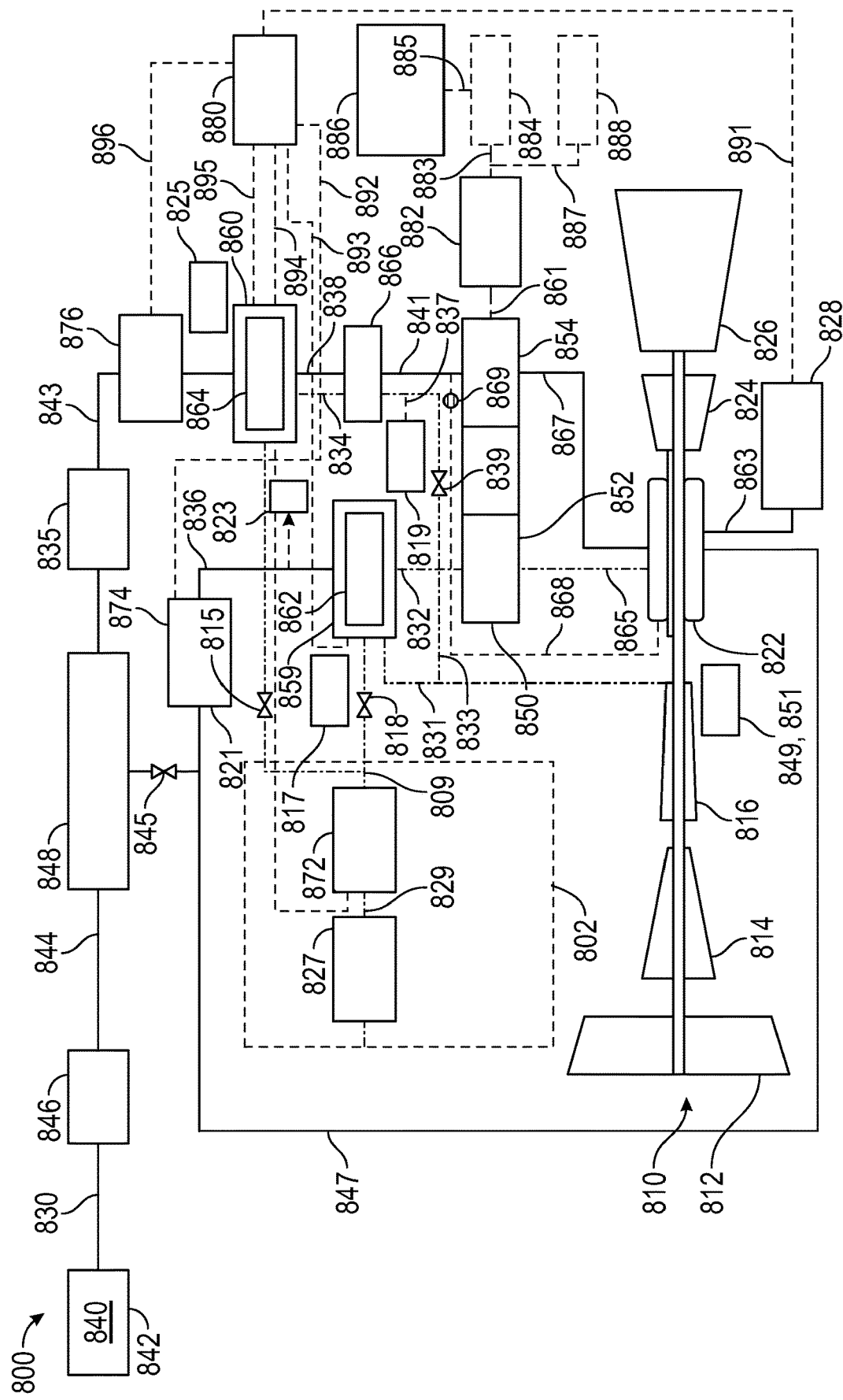
FIG. 8 shows a schematic illustration of an integrated fuel cell and combustor assembly used in a gas turbine engine system under transient conditions, according to still another embodiment of the present disclosure.

FIGS. 6, 7, and 8 show schematic illustrations of integrated fuel cell and combustor assemblies 600, 700 and 800 respectively, with like numerals representing like parts performing like functions, during transient conditions. Referring to FIGS. 6, 7, and 8, the integrated fuel cell and combustor assembly 600, 700 and 800 are supplied air with self-reliant air supply systems 602, 702 and 802 respectively. The self-reliant air supply systems 602, 702 and 802 do not depend on any external source for an intake air 632, 732 and 832 to be fed into fuel cell stacks 650, 750 and 850. The self-reliant air supply systems 602, 702 and 802, on the other hand, are configured to source the intake air 632, 732 and 832 completely from a transient-time air supply source within the integrated fuel cell and combustor assemblies 600, 700 and 800 during the transient event. The transient-time air supply source may be a bleed air 609 from a low pressure compressor 614 (e.g., FIG. 6), or fourth stage bleed air 709 from the high pressure compressor 716 (e.g., FIG. 7), or an internal air supply 809 that includes an ambient air or a cabin air or a cross-bleed air or an Auxiliary Power Unit air (APU air) or a RAM air (airflow created by a moving object to increase ambient pressure) (e.g., FIG. 8), or any combination of these conditions. Fault-tolerant controllers 680, 780 and 880 are configured to control the self-reliant air supply systems 602, 702 and 802 and continue the operations of the fuel cell stacks 650, 750 and 850 utilizing the respective transient-time air supplies.

Referring specifically to FIG. 6, the integrated fuel cell and combustor assembly 600 includes a gas turbine engine 610 having a combustor 622 that is fluidly coupled with an upstream fan 612, the low pressure compressor 614, and a high pressure compressor 616. The combustor 622 is fluidly coupled with a fuel cell stack 650 including a cathode 652 and an anode 654. The fuel cell stack 650 uses a hydrogen rich fuel stream 641, and intake air 632 and generates fuel cell power output 661. Further, fuel exhaust 667 and air exhaust 665 from the fuel cell stack 650 are discharged directly into the combustor 622.

The integrated fuel cell and combustor assembly 600 further includes a low pressure turbine 624 and a high pressure turbine 626 disposed downstream from and fluidly coupled with the combustor 622 such that the combustor 622 combusts the fuel exhaust 667 and air exhaust 665 from the fuel cell stack 650 into one or more gaseous combustion products that power the low pressure turbine 624 and the high pressure turbine 626.

The integrated fuel cell and combustor assembly 600 further includes fault-tolerant controller 680 that detects a transient event within the combustor 622 and controls the self-reliant air supply system 602 during the transient event. As is commonly known in the art, a typical fault-tolerant controller (FTCs) is a controller that is able to tolerate faults and keep the control performance of a system in an ideal range of operation, even in presence of the faults.

Referring back to the integrated fuel cell and combustor assembly 600 of FIG. 6, the self-reliant air supply system 602 utilizes the bleed air 609 from the low pressure compressor 614 as the transient-time air supply. Further, the fault-tolerant controller 680 operates the self-reliant air supply system 602 to sustain the fuel cell stack 650 during a transient event. Further, the fault-tolerant controller 680 is configured to use a part of the fuel cell power output 661 from a sustained fuel cell stack 650 and to power a transition event of the combustor 622 out of the transient event. The transition event typically includes relighting or igniting or starting or restarting of the combustor 622. The integrated fuel cell and combustor assembly 600 includes an engine operating condition monitoring element 628 to sense and/or detect several transient events, combustion related events, parameters, and a relighting component, such as a starter 684. The combustor assembly 600 further includes a power convertor 682 connected to the starter 684 by a connection 683 and an alternative, preexisting power source 686 connected to the starter 684 by a connection 685. The fault-tolerant controller 680 further controls flow of fuel and air associated with the relighting component such as the starter 684 for relighting the combustor 622.

Referring to FIG. 6, the integrated fuel cell and combustor assembly 600 is supplied with LPC bleed air 609 as a source of air supply. The integrated fuel cell and combustor assembly 600 further includes a CPOx 664, an LPC bleed air stream 627 to the CPOx 664, a CPOx air control valve 615 on the LPC bleed air stream 627, an air preburner system 662, an air preburner LPC bleed air stream 629, an air preburner air control valve 618 positioned on the air preburner LPC bleed air stream 629, an engine operating condition sensor line 663 from the combustor 622 to the engine operating condition monitoring element 628.

In one instance of the current disclosure, an ignitor (not shown) may be provided at the SOFC combustor liner for redundant lighting means during flameout. The fuel/air flows and the ignitor's operations are controlled for faster relighting by leveraging the SOFC as a fuel injector, with desired SOFC effluent (such as high $H_2$%) discharged into the combustor.

The integrated fuel cell and combustor assembly 600 further includes an integrated fuel reformer of fuel processing unit 660 that is fluidly connected with and supplied by a fuel tank 642 such that a portion of a fuel is directed from the fuel tank 642 to the fuel processing unit 660 for developing the hydrogen rich fuel stream 641. The fuel processing unit 660 includes the CPOx 664, a heat exchanger 666, a heat exchanger air entry pressure sensor 619, a heat exchanger air entry pressure sensor line 637, a CPOx air entry pressure sensor 621, a CPOx fuel entry pressure sensor 625, a heat exchanger HPC main air stream 633, a heat exchanger HPC main air valve 639, a heat exchanger CPOx air stream 634, and a hydrogen enriched fuel stream 638 flowing from the CPOx 664 to the heat exchanger 666. The CPOx with the supplied air feed maintains the anode inlet gas at a desired temperature within a range of (600° C. to 800° C.) and in a reduced atmosphere.

The integrated fuel cell and combustor assembly 600 further includes an air processing unit 659 fluidly connected to the fuel cell stack 650. The air processing unit 659 includes, the air preburner system 662, an air preburner fuel entry pressure sensor 617, an air preburner fuel entry pressure sensor 623, an air preburner HPC main air stream 631 passing through an air preburner HPC main air valve 620. The preburner with the supplied air feed maintains the cathode inlet gas within a desired temperature range (600° C. to 800° C.) and in an oxidized atmosphere. The air processing unit typically controls a temperature of the intake air 632 fed into the fuel cell stack 650 and the fuel tank 642 that is fluidly connected to the air processing unit 659. A portion of the fuel 640, a preburner fuel stream 636, from the fuel tank 642 is directed to the air processing unit 659 to regulate the temperature of the intake air 632 going into the fuel cell stack 650.

The integrated fuel cell and combustor assembly 600 further includes a supply of fuel 640 stored in the fuel tank 642 and transported in stages through a pipeline 630, a fuel pump 646, and pumped as a fuel stream 644 to a flow divider 648. The flow divider 648, connected to a cathode fuel control valve 645, divides the fuel stream 644 into the preburner fuel stream 636 flowing through a cathode fuel flow controller 674, and a combustor fuel stream 647 to the combustor 622. The integrated fuel cell and combustor assembly 600 further includes an anode fuel stream 643 flowing through a fuel vaporizer 635 and an anode fuel flow controller 676 arranged in series to the fuel processing unit 660 described in more details below.

The integrated fuel cell and combustor assembly 600 further includes a fuel pressure controller 672, a HPC exit pressure sensor 649, and a HPC exit temperature sensor 651.

The fault-tolerant controller 680 controls a number of components in the integrated fuel cell and combustor assembly 600 by receiving sensor inputs from respective sensor units and fault-tolerantly controlling all subsystems of the integrated fuel cell and combustor assembly 600, and the associated valves and regulators by respective control signals. The sensing or control signals related to the fault-tolerant controller 680 include an engine operating parameter signal 691 coming from the engine operating condition monitoring element 628, a control signal 692 controlling a cathode fuel flow controller 674, a control signal 693 controlling the air processing unit 659, a control signal 694 controlling the fuel pressure controller 672, a control signal 695 controlling the fuel processing unit 660 and a control signal 696 controlling the anode fuel flow controller 676.

Further, the fuel processing unit 660 or more specifically, the CPOx 664 is controlled by the control signal 695 from the fault-tolerant controller 680 based on an exit temperature of the fuel processing unit, an exit pressure of the fuel processing unit, or any combination thereof. Specifically, the fault-tolerant controller 680 controls the fuel processing unit 660 or more specifically, the CPOx 664 to maintain a reducing atmosphere for a fuel cell anode inlet gas and the reducing atmosphere typically includes a temperature within a predetermined range.

In one instance, the fuel processing unit 660 or more specifically, the CPOx 664 is controlled by the control signal 695 from the fault-tolerant controller 680 to maintain an oxygen carbon ratio within a predetermined range. Further, the fuel processing unit 660 or more specifically, the CPOx 664 may be controlled by the control signal 695 from the fault-tolerant controller 680 to maintain a fuel cell cathode inlet temperature within a predetermined range. The fuel processing unit 660 or more specifically, the CPOx 664 may be controlled by the control signal 695 from the fault-tolerant controller 680 to maintain a fuel cell anode inlet temperature within a predetermined range. Further, the fuel processing unit 660 or more specifically, the CPOx 664 may be controlled by the control signal 695 from the fault-tolerant controller 680 to control an operating condition of a fuel cells to generate an exhaust fuel of predetermined composition.

Referring to FIG. 6, the fuel pressure controller 672 is controlled by the control signal 694 from the fault-tolerant controller 680 to maintain a pressure difference between the anode 654 and the cathode 652 within a predetermined range. Further, an anode bypass valve 669 may be optionally controlled by the fault-tolerant controller 680 to bypass the fuel cell stack 650 and direct an anode inlet gas 668 directly into the combustor 622.

Further, the control signal 693 from the fault-tolerant controller 680 controls the air processing unit 659 based on an exit temperature of the air processing unit, or an exit pressure of the air processing unit, or any combination thereof. Specifically, the fault-tolerant controller 680 controls the air processing unit 659 by adjusting a flowrate of the portion of the fuel that is directed from the fuel source to the air processing unit 659.

In one instance, the air processing unit 659 includes the air preburner system 662. The air preburner system 662 is integrated with the CPOx 664 as well as the cathode bypass air stream 527 into an integrated fuel reformer or integrated fuel processing unit 660 to achieve a better thermal management with enhanced operability and faster startup. During a startup phase of the fuel reformer 664, or when the fuel reformer 664 is not able to thermally self-sustain, the air preburner system 662 provides heat for the fuel reformer 664. Specifically, preburner fuel stream 636, also referred to as cathode fuel, and cathode air 631 are burned in the air preburner system 662 to heat up the anode fuel/air feed until they reach a condition for steady reactions.

During other time, the preburner is turned off, by keeping the cathode fuel control valve 645 at fully closed state. This means there is no combustion reaction or heat release inside the air preburner 662. Then cathode air 631 passes through the air preburner system 662, which is heated by the CPOx reformer 664 (CPOx reaction releases a lot of heat while the fuel is reformed into H$_2$ rich gas). Also, the cathode air 631 facilitates the CPOx 664 temperature regulation to avoid thermal run-away of the CPOx 664. As the cathode air outlet temperature rises and reaches a value equal to or higher than a predetermined expected temperature, the cathode air bypass valve (e.g. 525 shown in FIG. 5) is opened to adjust the cathode inlet gas temperature within a specified range.

The anode fuel/air feed are maintained fuel rich. During abnormal event leading to oxidized atmosphere for the anode 654, the anode bypass valve 669 directs the anode inlet gas 668, directly, to combustor 622 without going through SOFC.

The air preburner system 662 is controlled by the fault-tolerant controller 680 to maintain an oxidizing atmosphere for a fuel cell cathode inlet gas, wherein the oxidizing atmosphere includes a temperature within a predetermined range.

In operation, the intake amount of a hydrogen rich fuel stream 641 to the fuel cell stack 650 is increased when an anode fuel flow rate is sensed to be less than a predefined threshold or a combustor exit temperature (T4) sensed to be lower than a predefined threshold or both. In one such instance, the fuel cell power output 661 is increased or decreased by adjusting a fuel utilization or an oxygen-to-fuel ratio of the fuel processing unit 660 or a total fuel flow rate or a temperature of the fuel cell stack or both.

FIG. 7 shows a schematic illustration of an integrated fuel cell and combustor assembly 700 used in a gas turbine engine system under transient conditions. Referring to FIG. 7, during a combustor transient event, the integrated fuel cell and combustor assembly 700 is supplied air with the self-reliant air supply system 702. The self-reliant air supply system 702 utilizes the fourth stage bleed air 709 from the high pressure compressor 716 as the transient-time air supply to sustain the operations of the fuel cell stack 750 and transitions a combustor 722 out of the transient event, as described in more details in relation to description of FIG. 6 above.

The integrated fuel cell and combustor assembly 700 includes a gas turbine engine 710 having the combustor 722 that is fluidly coupled with an upstream fan 712, a low pressure compressor 714 and a high pressure compressor 716. The combustor 722 is fluidly coupled with the fuel cell stack 750. The fuel cell stack 750 includes multiple fuel cells and is schematically represented as a combined unit including a cathode 752 and an anode 754. The fuel cell stack 750, using a hydrogen rich fuel stream 741 and intake air 732, generates a fuel cell power output 761. Further, fuel exhaust 767 and air exhaust 765 from the fuel cell stack 750 are discharged into the combustor 722. The integrated fuel cell and combustor assembly 700 further includes a low pressure turbine 724, a high pressure turbine 726 and a fault-tolerant controller 780 that detects a transient event within the combustor 722 and controls the self-reliant air supply system 702 during the transient event.

Referring back to FIG. 7, the integrated fuel cell and combustor assembly 700 includes an engine operating condition monitoring element 728, a starter 784 connected to a power convertor 782 by a connection 783 and an alternative, preexisting power source 786 connected to the starter 784 by a connection 785.

The integrated fuel cell and combustor assembly 700 is supplied air with HPC bleed air 709. The integrated fuel cell and combustor assembly 700 further includes a CPOx 764, a HPC bleed air stream 727 to the CPOx 764, a CPOx air control valve 715 on HPC bleed air stream 727, an air preburner 762, an air preburner HPC bleed air stream 729 to the an air preburner, an air preburner air control valve 718 on the air preburner HPC bleed air stream 729, the engine operating condition monitoring element 728 and an engine operating condition sensor line 763 from the combustor 722 to the engine operating condition monitoring element 728.

The integrated fuel cell and combustor assembly 700 further includes a fuel cell stack 750, the fuel cell power output 761 from the fuel cell stack 750, the air exhaust 765 from the fuel cell stack 750, a heat exchanger 766, the fuel exhaust 767 from the fuel cell stack 750, and the intake air 732 input to the fuel cell stack 750.

The integrated fuel cell and combustor assembly 700 further includes an integrated fuel reformer or fuel processing unit 760 that includes the CPOx 764, an air entry pressure sensor 719, a heat exchanger air entry pressure sensor line 737, a CPOx air entry pressure sensor 721, a CPOx fuel entry pressure sensor 725, a heat exchanger HPC main air stream 733, a heat exchanger HPC main air valve 739, a heat exchanger CPOx air stream 734, a hydrogen enriched fuel stream 738 flowing from the CPOx 764 to heat exchanger 766, and an anode bypass valve 769 that directs an anode inlet gas 768.

The integrated fuel cell and combustor assembly 700 further includes an air processing unit 759 that includes the air preburner 762, an air preburner fuel entry pressure sensor 717, an air preburner fuel entry pressure sensor 723, an air preburner HPC main air stream 731 passing through an air preburner HPC main air valve 720.

The integrated fuel cell and combustor assembly 700 further includes a supply of fuel 740 stored in a fuel tank 742 and transported in stages through a pipeline 730, a fuel pump 746, and pumped as a fuel stream 744 to a flow divider 748. The flow divider 748, connected to a cathode fuel control valve 745, divides the fuel stream 744 into a preburner fuel stream 736 flowing through a cathode fuel flow controller 774, and a combustor fuel stream 747 to the combustor 722. The integrated fuel cell and combustor assembly 700 further includes an anode fuel stream 743 flowing through a fuel vaporizer 735 and an anode fuel flow controller 776 arranged in series to the fuel processing unit 760.

The integrated fuel cell and combustor assembly 700 further includes a fuel pressure controller 772, the cathode fuel flow controller 774, the anode fuel flow controller 776, fault-tolerant controller 780, the power convertor 782, the starter 784 and the preexisting power source 786, a HPC exit pressure sensor 749, a HPC exit temperature sensor 751.

Sensing and/or control signals from/to the fault-tolerant controller 780 include an engine operating parameter signal 791 coming from the engine operating condition monitoring element 728, a control signal 792 controlling the cathode fuel flow controller 774, a control signal 793 controlling the air processing unit 759, a control signal 794 controlling fuel pressure controller 772, a control signal 795 controlling fuel processing unit 760 and a control signal 796 controlling the anode fuel flow controller 776.

Referring further to FIG. 7, the fuel processing unit 760 is fluidly connected to the fuel cell stack 750 and the fuel processing unit 760 develops the hydrogen rich fuel stream 741 directed into the anode 754 of the fuel cell stack 750. The fuel cell stack 750 is fluidly connected with and supplied by the fuel tank 742 such that a portion of a fuel is directed from the fuel tank 742 to the fuel cell stack 750 for developing the hydrogen rich fuel stream 741.

FIG. 8 shows a schematic illustration of an integrated fuel cell and combustor assembly 800 used in a gas turbine engine system under transient conditions, according to an embodiment of the present disclosure. Referring to FIG. 8, during a combustor transient event, the integrated fuel cell and combustor assembly 800 is supplied air by the self-reliant air supply system 802. The self-reliant air supply system 802 utilizes an internal air supply 809 that includes an ambient air or a cabin air or a cross-bleed air or an Auxiliary Power Unit air (APU air) or a RAM air as the transient-time air supply to sustain the operations of the fuel cell stack 850 and transitions a combustor 822 out of the transient event, as described in more details in relation to the description of FIG. 6 above.

The integrated fuel cell and combustor assembly 800 includes a gas turbine engine 810 having the combustor 822 that is fluidly coupled with an upstream fan 812, a low pressure compressor 814 and a high pressure compressor 816. The combustor 822 is fluidly coupled with the fuel cell stack 850. The fuel cell stack 850 includes multiple fuel cells and is schematically represented as a combined unit including a cathode 852 and an anode 854. The fuel cell stack 850 uses a hydrogen rich anode fuel stream 841 and intake air 832 and generates a fuel cell power output 861. Further, a fuel exhaust 867 and an air exhaust 865 from the fuel cell stack 850 are directed into the combustor 822.

The integrated fuel cell and combustor assembly 800 also includes a low pressure turbine 824, a high pressure turbine 826 and a fault-tolerant controller 880 that detects a transient event within the combustor 822 and controls the self-reliant air supply system 802 during the transient event.

Referring back FIG. 8, the integrated fuel cell and combustor assembly 800 includes an engine operating condition monitoring element 828, a starter 884 connected to a power convertor 882 by connection 883, an alternative, a preexisting power source 886 connected to the starter 884 by a connection 885 and an air blower 888 connected to the power convertor 882 by a connection 887.

Referring to FIG. 8, the integrated fuel cell and combustor assembly 800 is supplied air with internal air supply 809 pressurized using a mechanical component, such as an air pump or an air blower 827, powered by the fuel cell stack 850 sustained during the transient event. The integrated fuel cell and combustor assembly 800 further includes a CPOx 864, a CPOx air control valve 815 on internal air supply 809, an air preburner internal air supply air stream 829, an air preburner air control valve 818 on the air preburner internal air supply air stream 829, the engine operating condition monitoring element 828 and an engine operating condition sensor line 863 from the combustor 822 to the engine operating condition monitoring element 828.

The integrated fuel cell and combustor assembly 800 includes the fuel cell stack 850, the cathode 852 of the fuel cell stack 850, the anode 854 of the fuel cell stack 850, the fuel cell power output 861 from the fuel cell stack 850, the air exhaust 865 from the fuel cell stack 850, a heat exchanger 866, the fuel exhaust 867 from the fuel cell stack 850, and the intake air 832 input into the fuel cell stack 850.

The integrated fuel cell and combustor assembly 800 further includes an integrated fuel reformer of fuel processing unit 860 that includes the CPOx 864, the heat exchanger 866, an air entry pressure sensor 819, a heat exchanger air entry pressure sensor line 837, a CPOx air entry pressure sensor 821, a CPOx fuel entry pressure sensor 825, a heat exchanger HPC main air stream 833, a heat exchanger HPC main air valve 839, a heat exchanger CPOx air stream 834, and a hydrogen enriched fuel stream 838 flowing from the CPOx 864 to the heat exchanger 866 and an anode bypass valve 869 that directs an anode inlet gas 868 to the combustor 822 directly without going through the SOFC.

The integrated fuel cell and combustor assembly 800 further includes an air processing unit 859, an air preburner 862, an air preburner fuel entry pressure sensor 817, an air preburner fuel entry pressure sensor 823, and an air preburner HPC main air stream 831.

The integrated fuel cell and combustor assembly 800 further includes a supply of fuel 840 stored in a fuel tank 842 and transported in stages through a pipeline 830, a fuel pump 846, and pumped as a fuel stream 844 to a flow divider 848. The flow divider 848, connected to a cathode fuel control valve 845, divides the fuel stream 844 into a preburner fuel stream 836 flowing through a cathode fuel flow controller 874, and a combustor fuel stream 847 to the combustor 822. The integrated fuel cell and combustor assembly 800 further includes an anode fuel stream 843 flowing through a fuel vaporizer 835 and an anode fuel flow controller 876.

The integrated fuel cell and combustor assembly 800 includes a fuel pressure controller 872, the cathode fuel flow controller 874, the anode fuel flow controller 876, the fault-tolerant controller 880, the power convertor 882, the starter 884, the preexisting power source 886, a HPC exit pressure sensor 849, and a HPC exit temperature sensor 851.

Sensing and/or control signals from/to the fault-tolerant controller 880 include an engine operating parameter signal 891 coming from the engine operating condition monitoring element 828, a control signal 892 controlling the cathode fuel flow controller 874, a control signal 893 controlling the air processing unit 859, a control signal 894 controlling the fuel pressure controller 872, a control signal 895 controlling the fuel processing unit 860 and a control signal 896 controlling the anode fuel flow controller 876.

Referring further to FIG. 8, the fuel processing unit 860, fluidly connected to the fuel cell stack 850 and the fuel processing unit 860, develops the hydrogen rich anode fuel stream 841 directed into the anode 854 of the fuel cell stack 850. The fuel cell stack 850 is fluidly connected with and supplied by the fuel tank 842 such that a portion of a fuel is directed from the fuel tank 842 to the fuel cell stack 850 for developing the hydrogen rich anode fuel stream 841.

Figure 9:
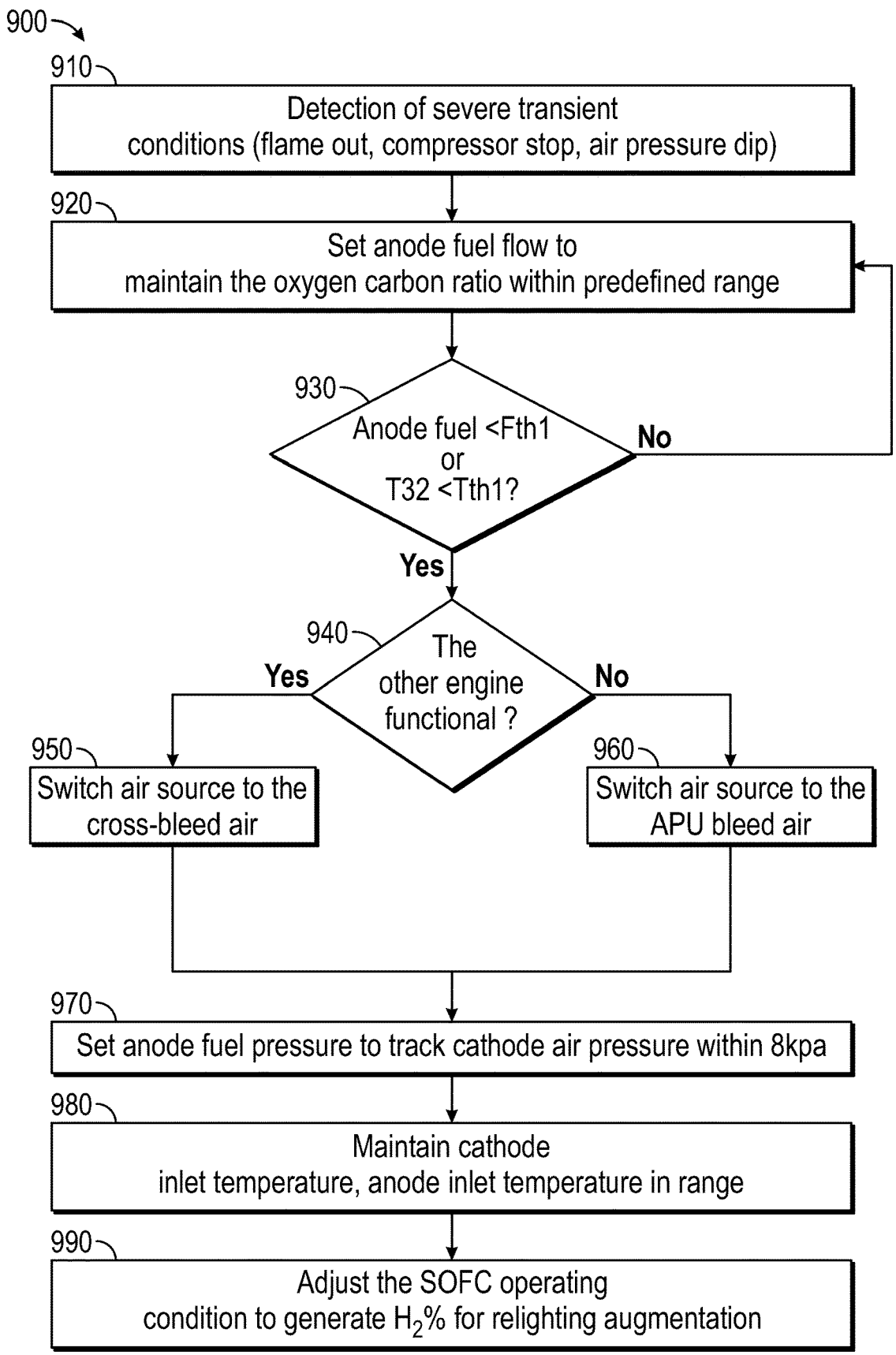
FIG. 9 shows a schematic flowchart of a method of operating an integrated fuel cell and combustor assembly, according to an embodiment of the present disclosure.

FIG. 9 shows a schematic flowchart of a method of operating an integrated fuel cell and combustor assembly, according to an embodiment of the present disclosure. Referring to FIG. 9, a method 900 includes detection of severe transient conditions (flameout, compressor stop, air pressure dip), as shown in step 910. Further, anode fuel flow is set to maintain the oxygen carbon ratio within a predefined range, as shown in step 920. Further, as shown in step 930, it is determined whether anode fuel (F32) is less than a fuel threshold or whether anode temperature is less than a threshold temperature (T32). Further, it is determined whether a second or auxiliary engine is functional and available, as shown in step 940. If available, the air source is switched to a cross-bleed air from the second or auxiliary engine, as shown in step 950. If a second or auxiliary engine is not available, the air source is switched to APU bleed air, as shown in step 960. Further, anode fuel pressure is set to track cathode air pressure within eight kilopascal (kpa), as shown in step 970. Cathode inlet temperature and anode inlet temperature are maintained within a predetermined range, as shown in step 980. The SOFC operating condition is adjusted to generate $H_2$% for relighting augmentation, as shown in step 990.

The integrated fuel cell and combustor assembly of the present disclosure may provide a system for enhancing the system efficiency of a gas turbine engine and reducing emissions from the engine, and a related method. There is a need for reliable system architecture to protect SOFC subsystem during combustion transient events such as a flameout. Typical engine configurations rely on HPC exit air for SOFC operation and a flameout or any other kind of sudden loss of high pressure air typically leads to SOFC subsystem failure. The integrated fuel cell and combustor assembly of the present disclosure may provide a system and method of self-reliantly supplying bleed air (at LPC exit or HPC stage 4) to the SOFC air-preburner and fuel reformer to maintain SOFC continuous operation during a transient, specifically a flameout event.

The integrated fuel cell and combustor assembly of the present disclosure may provide a fuel pressure controller and a method to maintain anode/cathode pressure difference within eight kpa to avoid sealing leakage during a transient, specifically a flameout event. The SOFC electrodes are typically connected to engine starter and other auxiliary loads to augment the relight process during flameout. Thus, uninterrupted operation of the SOFC electrodes improves the efficiency and effectiveness of an engine relight process in the event of a flameout.

The integrated fuel cell and combustor assembly of the present disclosure may provide the power supply of the SOFC during flameout provide redundant power and a method for transitioning the combustor out of the transient event and relighting or restarting the engine. The exhaust-$H_2$ rich fuel of the SOFC further augments an engine relight process.

The integrated fuel cell and combustor assembly of the present disclosure may provide a self-reliant air supply system fluidly coupled with one of the compressors and an SOFC fuel cell stack and a method to supply the intake air to the fuel cell stack to sustain the fuel cell stack during a flameout. Further, the self-reliant air supply system sources the intake air from at least a part of the assembly.

The integrated fuel cell and combustor assembly of the present disclosure may provide a fault-tolerant controller configured to detect a transient event within the combustor and a method to control the self-reliant air supply system during the transient event. The fault-tolerant controller is configured to selectively source the intake air from a transient-time air supply source during the transient event.

Further aspects of the present disclosure are provided by the subject matter of the following clauses.

An integrated fuel cell and combustor assembly includes a combustor fluidly coupled with at least one upstream compressor, a fuel cell stack having a cathode and an anode, a self-reliant air supply system fluidly coupled with the at least one upstream compressor and the fuel cell stack, and a fault-tolerant controller. The at least one upstream compressor generates compressed air. The fuel cell stack is fluidly coupled to the combustor and is configured to receive intake fuel and a portion of the compressed air as intake air, to generate a fuel cell power output using the intake fuel and the intake air, and to direct a fuel and air exhaust from the fuel cell stack into the combustor. The self-reliant air supply system is configured to supply the intake air to the fuel cell stack. The fault-tolerant controller is configured to detect a transient event within the combustor and to control the self-reliant air supply system during the transient event.

The assembly according to any preceding clause, wherein the combustor is fluidly coupled with at least one turbine disposed downstream from the combustor, the combustor being configured to combust the fuel and air exhaust from the fuel cell stack into one or more gaseous combustion products that power the turbine.

The assembly according to any preceding clause, wherein the fuel cell stack is disposed upstream of the combustor, or integrated within an inner liner of the combustor, or integrated within an outer liner of the combustor, or any combination thereof.

The assembly according to any preceding clause, further comprising at least one engine operating condition monitoring element configured to detect the transient event and to send a detection signal to the fault-tolerant controller.

The assembly according to any preceding clause, further comprising a relighting component, the fault-tolerant controller being configured to control a fuel flow and an air flow associated with the relighting component and to control the relighting component to relight the combustor.

The assembly according to any preceding clause, wherein the fault-tolerant controller is further configured to sustain the fuel cell stack during the transient event.

The assembly according to any preceding clause, wherein the fault-tolerant controller is further configured to use at least a portion of the fuel cell power output from the fuel cell stack sustained during the transient event to power a transition event of the combustor out of the transient event.

The assembly according to any preceding clause, wherein the transient event comprises a flameout, or a compressor stop, or an air pressure dip, or any combination thereof, and wherein the transition event comprises relighting, or starting, or restarting, or any combination thereof, of the combustor.

The assembly according to any preceding clause, wherein the self-reliant air supply system is configured to source the intake air from at least a part of the assembly.

The assembly according to any preceding clause, wherein the fault-tolerant controller is further configured to selectively source the intake air from a transient-time air supply source during the transient event.

The assembly according to any preceding clause, wherein the transient-time air supply source comprises bleed air from the at least one upstream compressor, or ambient air, or cabin air, or cross-bleed air, or Auxiliary Power Unit (APU) air, or RAM air, or any combination thereof.

The assembly according to any preceding clause, further comprising a fuel processing unit having an exit temperature and an exit pressure, and a fuel source that is fluidly connected to the fuel processing unit. The fuel processing unit is fluidly connected to the fuel cell stack, and configured to develop a hydrogen rich fuel stream to be directed into the fuel cell stack. A portion of a fuel is directed from the fuel source to the fuel processing unit for developing the hydrogen rich fuel stream.

The assembly according to any preceding clause, wherein the fault-tolerant controller is configured to control the fuel cell stack to adjust a fuel cell power output by adjusting a fuel utilization in the fuel processing unit, or by adjusting an oxygen-to-fuel ratio in the fuel processing unit, or by adjusting a total fuel flow rate in the assembly, or by adjusting a temperature of the fuel cell stack, or any combination thereof, based on the exit temperature of the fuel processing unit, the exit pressure of the fuel processing unit, or any combination thereof.

The assembly according to any preceding clause, wherein the fuel processing unit comprises a catalytic partial oxidation convertor (CPOx), or a heat exchanger, or any combination thereof.

The assembly according to any preceding clause, wherein the fault-tolerant controller is configured to control the fuel processing unit based on the exit temperature of the fuel processing unit, the exit pressure of the fuel processing unit, or any combination thereof, to maintain a reducing atmosphere for a fuel cell anode inlet gas. The reducing atmosphere comprises a temperature within a predetermined range.

The assembly according to any preceding clause, wherein the fault-tolerant controller is configured to control the fuel processing unit, based on the exit temperature of the fuel processing unit, the exit pressure of the fuel processing unit, or any combination thereof to maintain an oxygen carbon ratio within a predetermined range, or to maintain a fuel cell cathode inlet temperature within a predetermined range, or to maintain a fuel cell anode inlet temperature within a predetermined range, or to control an operating condition of the fuel cell stack to generate an exhaust fuel of predetermined composition, or any combination thereof.

The assembly according to any preceding clause, further comprising a fuel pressure controller, the fault-tolerant controller being configured to control the fuel pressure controller based on the exit temperature of the fuel processing unit, the exit pressure of the fuel processing unit, or any combination thereof, to maintain a pressure difference between the anode and the cathode within a predetermined range.

The assembly according to any preceding clause, further comprising an anode bypass valve, wherein the fault-tolerant controller is configured to control the anode bypass valve, based on the exit temperature of the fuel processing unit, the exit pressure of the fuel processing unit, or any combination thereof, to direct a fuel cell anode inlet gas into the combustor, bypassing the fuel cell stack.

The assembly according to any preceding clause, further includes an air processing unit having an exit temperature and an exit pressure and a fuel source that is fluidly connected to the air processing unit. The air processing unit is fluidly connected to the fuel cell stack and being configured to control a temperature of the portion of the intake air to the fuel cell stack. A portion of the fuel is directed from the fuel source to the air processing unit to regulate the temperature of the portion of the intake air to the fuel cell stack.

The assembly according to any preceding clause, wherein the fault-tolerant controller is configured to control the air processing unit based on the exit temperature of the air processing unit, or the exit pressure of the air processing unit, or any combination thereof, to direct a cathode bypass air stream into the combustor, bypassing a fuel cell cathode of the fuel cell stack.

The assembly according to any preceding clause, further comprising a fuel flow controller, wherein the fault-tolerant controller is configured to control the fuel flow controller based on the exit temperature of the air processing unit, or the exit pressure of the air processing unit, or any combination thereof, to adjust an anode fuel flow to a fuel cell stack when an anode fuel flow rate is less than a predefined threshold, or a combustor exit temperature is lower than a predefined threshold, or both.

The assembly according to any preceding clause, wherein the air processing unit comprises an air preburner configured to heat the portion of the intake air to the fuel cell stack.

The assembly according to any preceding clause, wherein the fault-tolerant controller is configured to control the air processing unit based on the exit temperature of the air processing unit, or the exit pressure of the air processing unit, or any combination thereof, and to adjust a flowrate of the portion of the fuel that is directed from the fuel source to the air processing unit.

The assembly according to any preceding clause, wherein the fault-tolerant controller is configured to control the air processing unit based on the exit temperature of the air processing unit, or the exit pressure of the air processing unit, or any combination thereof, and to maintain an oxidizing atmosphere for a fuel cell cathode inlet gas. The oxidizing atmosphere comprises a temperature within a predetermined range.

The assembly according to any preceding clause, wherein the fault-tolerant controller is configured to control the air processing unit based on the exit temperature of the air processing unit, or the exit pressure of the air processing unit, or any combination thereof, and to maintain a catalytic partial oxidation convertor (CPOx) outlet temperature within a predetermined range.

A method of operating an integrated fuel cell and combustor assembly includes providing a combustor, fluidly coupling the combustor with at least one upstream compressor that generates compressed air, fluidly coupling a fuel cell stack with the combustor, generating a fuel cell power output using an intake fuel and a portion of the compressed air as intake air directed into the fuel cell stack, directing a fuel and air exhaust from the fuel cell stack into the combustor, detecting a transient event within the combustor, self-reliantly supplying the intake air to the fuel cell stack during the transient event and fault-tolerantly controlling the intake air to the fuel cell stack during the transient event. The fuel cell stack has a cathode and an anode.

The method according to any preceding clause, further comprising fluidly coupling at least one turbine disposed downstream from the combustor and combusting the fuel and air exhaust from the fuel cell stack into one or more gaseous combustion products that power the turbine.

The method according to any preceding clause, wherein the fluidly coupling a fuel cell stack with the combustor comprises disposing the fuel cell stack upstream of the combustor, or integrating within an inner liner of the combustor, or integrating within an outer liner of the combustor, or any combination thereof.

The method according to any preceding clause, wherein the detecting a transient event within the combustor comprises providing at least one engine operating condition monitoring element to detect the transient event and receiving a detection signal from the at least one engine operating condition monitoring element.

The method according to any preceding clause, further comprising providing a relighting component within the combustor, fault-tolerantly controlling a fuel flow and an air flow associated with the relighting component, and fault-tolerantly controlling the relighting component to relight the combustor.

The method according to any preceding clause, wherein the fault-tolerantly controlling comprises sustaining the fuel cell stack during the transient event.

The method according to any preceding clause, wherein the fault-tolerantly controlling comprises using at least a portion of the fuel cell power output from the fuel cell stack sustained during the transient event to power a transition event of the combustor out of the transient event.

The method according to any preceding clause, wherein the transient event comprises a flameout, or a compressor stop, or an air pressure dip, or any combination thereof, and wherein the transition event comprises a relighting, or a starting, or a restarting, or any combination thereof, of the combustor.

The method according to any preceding clause, wherein the self-reliantly supplying comprises sourcing the intake air from at least a part of the assembly.

The method according to any preceding clause, wherein the fault-tolerantly controlling comprises selectively sourcing the intake air from a transient-time air supply source during the transient event.

The method according to any preceding clause, wherein the transient-time air supply source comprises bleed air from the at least one upstream compressor, or ambient air, or cabin air, or cross-bleed air, or Auxiliary Power Unit (APU) air, or RAM air, or any combination thereof.

The method according to any preceding clause, further comprising providing a fuel processing unit having an exit temperature and an exit pressure, fluidly connecting the fuel processing unit to the fuel cell stack, configuring the fuel processing unit to develop a hydrogen rich fuel stream, and directing the hydrogen rich fuel stream into the fuel cell stack, fluidly connecting a fuel source to the fuel processing unit and directing a portion of fuel from the fuel source to the fuel processing unit for developing the hydrogen rich fuel stream.

The method according to any preceding clause, wherein the fault-tolerantly controlling comprises controlling fuel cell stack and adjusting the fuel cell power output by adjusting a fuel utilization in the fuel processing unit, or by adjusting an oxygen-to-fuel ratio in the fuel processing unit, or by adjusting a total fuel flow rate in the assembly, or by adjusting a temperature of the fuel cell stack, or any combination thereof, based on the exit temperature of the fuel processing unit, the exit pressure of the fuel processing unit, or any combination thereof.

The method according to any preceding clause, wherein the fluidly connecting the fuel processing unit to the fuel cell stack comprises fluidly connecting a catalytic partial oxidation convertor (CPOx), or a heat exchanger, or any combination thereof.

The method according to any preceding clause, wherein the fault-tolerantly controlling comprises controlling the fuel processing unit based on the exit temperature of the fuel processing unit, the exit pressure of the fuel processing unit, or any combination thereof, maintaining a reducing atmosphere for a fuel cell anode inlet gas, and maintaining a temperature of the fuel cell anode inlet gas within a predetermined range.

The method according to any preceding clause, wherein the fault-tolerantly controlling comprises controlling the fuel processing unit based on the exit temperature of the fuel processing unit, the exit pressure of the fuel processing unit, or any combination thereof, maintaining an oxygen carbon ratio within a predetermined range, or maintaining a fuel cell cathode inlet temperature within a predetermined range, or maintaining a fuel cell anode inlet temperature within a predetermined range, or controlling an operating condition of the fuel cell stack and generating an exhaust fuel of predetermined composition, or any combination thereof.

The method according to any preceding clause, wherein the fault-tolerantly controlling comprises controlling a fuel pressure controller based on the exit temperature of the fuel processing unit, the exit pressure of the fuel processing unit, or any combination thereof, and maintaining a pressure difference between the anode and the cathode within a predetermined range.

The method according to any preceding clause, wherein the fault-tolerantly controlling comprises controlling an anode bypass valve based on the exit temperature of the fuel processing unit, the exit pressure of the fuel processing unit, or any combination thereof, and directing a fuel cell anode inlet gas into the combustor bypassing the fuel cell stack.

The method according to any preceding clause, further comprising providing an air processing unit having an exit temperature and an exit pressure, fluidly connecting the air processing unit to the fuel cell stack, configuring the air processing unit to control a temperature of a portion of compressed air directed into the fuel cell stack from the upstream compressor, fluidly connecting a fuel source to the air processing unit, directing a portion of fuel from the fuel source to the air processing unit, and regulating the temperature of the portion of the compressed air directed into the fuel cell stack from the compressor.

The method according to any preceding clause, wherein the fault-tolerantly controlling comprises controlling the air processing unit based on the exit temperature of the air processing unit, or the exit pressure of the air processing unit, or any combination thereof, and directing a cathode bypass air stream into the combustor, bypassing a fuel cell cathode of the fuel cell stack.

The method according to any preceding clause, wherein the fault-tolerantly controlling comprises controlling a fuel flow controller based on the exit temperature of the air processing unit, or the exit pressure of the air processing unit, or any combination thereof, and adjusting an anode fuel flow to the fuel cell stack when an anode fuel flow rate is less than a predefined threshold, or a combustor exit temperature is lower than a predefined threshold, or both.

The method according to any preceding clause, wherein the fluidly connecting the air processing unit to the fuel cell stack comprises fluidly connecting an air preburner to the fuel cell stack to heat the portion of the intake air to the fuel cell stack.

The method according to any preceding clause, wherein the fault-tolerantly controlling comprises controlling the air processing unit based on the exit temperature of the air processing unit, or the exit pressure of the air processing unit, or any combination thereof, and adjusting a flowrate of the portion of the fuel that is directed from the fuel source to the air processing unit.

The method according to any preceding clause, wherein the fault-tolerantly controlling comprises controlling the air processing unit based on the exit temperature of the air processing unit, or the exit pressure of the air processing unit, or any combination thereof, and maintaining an oxidizing atmosphere for a fuel cell cathode inlet gas, wherein the oxidizing atmosphere comprises a temperature within a predetermined range.

The method according to any preceding clause, wherein the fault-tolerantly controlling comprises controlling the air processing unit based on the exit temperature of the air processing unit, or the exit pressure of the air processing unit, or any combination thereof, and maintaining a catalytic partial oxidation convertor (CPOx) outlet temperature within a predetermined range.

Although the foregoing description is directed to the preferred embodiments, it is noted that other variations and modifications will be apparent to those skilled in the art, and may be made without departing from the spirit or scope of the disclosure Moreover, features described in connection with an embodiment may be used in conjunction with other embodiments, even if not explicitly stated above.

The invention claimed is:

1. An integrated fuel cell and combustor assembly, the assembly comprising:
    a combustor fluidly coupled with at least one upstream compressor, the at least one upstream compressor generating compressed air;
    a fuel cell stack having a cathode and an anode, the fuel cell stack being fluidly coupled to the combustor and being configured (i) to receive intake fuel and a portion of the compressed air as intake air, (ii) to generate a fuel cell power output using the intake fuel and the intake air, and (iii) to direct a fuel and air exhaust from the fuel cell stack into the combustor, wherein the fuel cell stack is integrated within an inner liner of the combustor, or integrated within an outer liner of the combustor, or any combination thereof;
    a relighting component electrically connected to the fuel cell stack, wherein the relighting component receives a portion of the fuel cell power output;
    a self-reliant air supply system fluidly coupled with the at least one upstream compressor and the fuel cell stack, and configured to supply the intake air to the fuel cell stack; and
    a fault-tolerant controller configured (i) to detect a transient event within the combustor and (ii) to control the self-reliant air supply system during the transient event, wherein the fuel cell stack continues to generate the fuel cell power output after the transient event has occurred and wherein the portion of the fuel cell power output provided to the relighting device is generated after the transient event has occurred.

2. The assembly of claim 1, wherein the combustor is fluidly coupled with at least one turbine disposed downstream from the combustor, the combustor being configured to combust the fuel and air exhaust from the fuel cell stack into one or more gaseous combustion products that power the turbine.

3. The assembly of claim 1, wherein the combustor is a component of a gas turbine engine, the assembly further comprising at least one engine operating condition monitoring element coupled to the gas turbine engine and configured to detect the transient event and to send a detection signal to the fault-tolerant controller.

4. The assembly of claim 1, wherein the fault-tolerant controller is configured (i) to control a fuel flow and an air flow associated with the relighting component and (ii) to control the relighting component to relight the combustor.

5. The assembly of claim 1, wherein the fault-tolerant controller is further configured (i) to sustain the fuel cell stack during the transient event, and (ii) to use at least a portion of the fuel cell power output from the fuel cell stack sustained during the transient event to power a transition event of the combustor out of the transient event.

6. The assembly of claim 5, wherein the transient event comprises a flameout, or a compressor stop, or an air pressure dip, or any combination thereof, and wherein the transition event comprises relighting, or starting, or restarting, or any combination thereof, of the combustor.

7. The assembly of claim 1, wherein the self-reliant air supply system is configured to source the intake air from at least a part of the assembly.

8. The assembly of claim 7, wherein the fault-tolerant controller is further configured to selectively source the intake air from a transient-time air supply source during the transient event, wherein the transient-time air supply source comprises bleed air from the at least one upstream compressor, or ambient air, or cabin air, or cross-bleed air, or Auxiliary Power Unit (APU) air, or RAM air, or any combination thereof.

9. The assembly of claim 8, further comprising:
    a fuel processing unit having an exit temperature and an exit pressure, the fuel processing unit being (i) fluidly connected to the fuel cell stack, and (ii) configured to develop a hydrogen rich fuel stream to be directed into the fuel cell stack; and
    a fuel source that is fluidly connected to the fuel processing unit, wherein a portion of a fuel is directed from the fuel source to the fuel processing unit for developing the hydrogen rich fuel stream.

10. The assembly of claim 9, wherein the fault-tolerant controller is configured to control the fuel cell stack to adjust a fuel cell power output by adjusting a fuel utilization in the fuel processing unit, or by adjusting an oxygen-to-fuel ratio in the fuel processing unit, or by adjusting a total fuel flow rate in the assembly, or by adjusting a temperature of the fuel cell stack, or any combination thereof, based on the exit temperature of the fuel processing unit, the exit pressure of the fuel processing unit, or any combination thereof.

11. The assembly of claim 9, wherein the fuel processing unit comprises a catalytic partial oxidation convertor (CPOx), or a heat exchanger, or any combination thereof.

12. The assembly of claim 11, wherein the fault-tolerant controller is configured to control the fuel processing unit based on the exit temperature of the fuel processing unit, the exit pressure of the fuel processing unit, or any combination thereof, (i) to maintain a reducing atmosphere for a fuel cell anode inlet gas, wherein the reducing atmosphere comprises a temperature within a predetermined range, or (ii) to maintain an oxygen carbon ratio within a predetermined range, or (iii) to maintain a fuel cell cathode inlet temperature within a predetermined range, or (iv) to maintain a fuel cell anode inlet temperature within a predetermined range, or (v) to control an operating condition of the fuel cell stack to generate an exhaust fuel of predetermined composition, or any combination thereof.

13. The assembly of claim 11, further comprising a fuel pressure controller, the fault-tolerant controller being configured to control the fuel pressure controller based on the exit temperature of the fuel processing unit, the exit pressure of the fuel processing unit, or any combination thereof, to maintain a pressure difference between the anode and the cathode within a predetermined range.

14. The assembly of claim 11, further comprising an anode bypass valve, wherein the fault-tolerant controller is configured to control the anode bypass valve, based on the exit temperature of the fuel processing unit, the exit pressure of the fuel processing unit, or any combination thereof, to direct a fuel cell anode inlet gas into the combustor, bypassing the fuel cell stack.

15. The assembly of claim 9, further comprising:
an air processing unit having an exit temperature and an exit pressure, the air processing unit being fluidly connected to the fuel cell stack and being configured to control a temperature of the portion of the intake air to the fuel cell stack; and
a fuel source that is fluidly connected to the air processing unit, wherein a portion of the fuel is directed from the fuel source to the air processing unit to regulate the temperature of the portion of the intake air to the fuel cell stack.

16. The assembly of claim 15, wherein the fault-tolerant controller is configured to control the air processing unit based on the exit temperature of the air processing unit, or the exit pressure of the air processing unit, or any combination thereof, to direct a cathode bypass air stream into the combustor, bypassing a fuel cell cathode of the fuel cell stack.

17. The assembly of claim 15, further comprising a fuel flow controller, wherein the fault-tolerant controller is configured to control the fuel flow controller based on the exit temperature of the air processing unit, or the exit pressure of the air processing unit, or any combination thereof, to adjust an anode fuel flow to a fuel cell stack when an anode fuel flow rate is less than a predefined threshold, or a combustor exit temperature is lower than a predefined threshold, or both.

18. The assembly of claim 15, wherein the air processing unit comprises an air preburner configured to heat the portion of the intake air to the fuel cell stack, and further wherein the fault-tolerant controller is configured (i) to control the air processing unit based on the exit temperature of the air processing unit, or the exit pressure of the air processing unit, or any combination thereof, (ii) to adjust a flowrate of the portion of the fuel that is directed from the fuel source to the air processing unit, (iii) to maintain an oxidizing atmosphere for a fuel cell cathode inlet gas, wherein the oxidizing atmosphere comprises a temperature within a predetermined range, and (iv) to maintain a catalytic partial oxidation convertor (CPOx) outlet temperature within a predetermined range.

19. A method of operating an integrated fuel cell and combustor assembly, the method comprising:
providing a combustor;
fluidly coupling the combustor with at least one upstream compressor, the at least one upstream compressor generating compressed air;
fluidly coupling a fuel cell stack with the combustor, the fuel cell stack having a cathode and an anode, wherein the fuel cell stack is integrated within an inner liner of the combustor, or integrated within an outer liner of the combustor, or any combination thereof;
generating a fuel cell power output using an intake fuel and a portion of the compressed air as intake air directed into the fuel cell stack;
directing a fuel and air exhaust from the fuel cell stack into the combustor;
directing a portion of the fuel cell power output to a relighting component electrically connected to the fuel cell stack;
detecting a transient event within the combustor;
self-reliantly supplying the intake air to the fuel cell stack during the transient event;
fault-tolerantly controlling the intake air to the fuel cell stack during the transient event; and
continuing to generate the fuel cell power output after the transient event has occurred, wherein the portion of the fuel cell power output provided to the relighting device is generated after the transient event has occurred.

* * * * *